(12) United States Patent
Lee et al.

(10) Patent No.: US 7,521,890 B2
(45) Date of Patent: Apr. 21, 2009

(54) SYSTEM AND METHOD FOR SELECTIVE TRANSFER OF RADIO FREQUENCY POWER

(75) Inventors: Yeechun Lee, Mountain View, CA (US); Victor Su, Mountain View, CA (US)

(73) Assignee: Power Science Inc., San Jose, CA (US)

( * ) Notice: Subject to any disclaimer, the term of this patent is extended or adjusted under 35 U.S.C. 154(b) by 324 days.

(21) Appl. No.: 11/319,818

(22) Filed: Dec. 27, 2005

(65) Prior Publication Data

US 2007/0145830 A1  Jun. 28, 2007

(51) Int. Cl.
*H01M 10/46* (2006.01)
(52) U.S. Cl. .................................... 320/108
(58) Field of Classification Search ............... 320/108, 320/109, 112, 114, 116
See application file for complete search history.

(56) References Cited

U.S. PATENT DOCUMENTS

| | | | |
|---|---|---|---|
| 6,803,744 B1 * | 10/2004 | Sabo | 320/108 |
| 6,954,180 B1 * | 10/2005 | Braun et al. | 343/702 |
| 7,245,269 B2 * | 7/2007 | Sievenpiper et al. | 343/909 |
| 2006/0043927 A1 * | 3/2006 | Beart et al. | 320/108 |

* cited by examiner

*Primary Examiner*—Edward Tso
(74) *Attorney, Agent, or Firm*—Holland & Knight LLP; John P. Moran

(57) ABSTRACT

A system and method is provided for the inductive transfer of electric power between a substantially flat primary surface and a multitude of secondary devices in such a way that the power transfer is localized to the vicinities of individual device coils. The contact free power transfer does not require precise physical alignment between the primary surface and the secondary device and can allow the secondary device or devices to be placed anywhere and in arbitrary orientation with respect to the primary surface. Such power transfer is realized without the need of complex high frequency power switching network to turn the individual primary coils on or off and is completely scalable to almost arbitrary size. The local anti-resonance architecture of the primary device will block primary current from flowing when no secondary device or devices are in proximity to the local RF power network. The presence of a tuned secondary device detunes the local anti-resonance on the primary surface; thereby enable the RF power to be transferred from the local primary coils to the secondary device. The uniformity of the inductive coupling between the active primary surface and the secondary devices is improved with a novel multi-pole driving technique which produces an apparent traveling wave pattern across the primary surface.

25 Claims, 16 Drawing Sheets

SYSTEM AND METHOD FOR SELECTIVE TRANSFER OF RADIO FREQUENCY POWER

FIELD OF INVENTION

One embodiment described herein relates to a system and method for efficient and safe transfer of electrical power without needing conductive contacts.

BACKGROUND OF THE INVENTION

Contact free power transfer has been around for a long time. A case in point is the transformer which converts high voltage AC power into low voltage AC power and vice versa through a shared inductive magnetic field. The inductive magnetic filed is generated by the primary coil which induces an electromotive force that propels electrons in the secondary conducting coil with the aid of a high magnetic permeability material core. There are no direct electrical conductive contacts between the primary and the secondary coils. A modern example of a transformer is the Braun Oral B toothbrush, which relies on the external casing of the toothbrush base to guide the toothbrush to mate with the internal shape of the charger module, thus allowing the primary coil, the secondary coil, and the high permeability cores to align perfectly so that charging can take place. Other induction charging device prior arts are similarly restrictive in the way the primary unit mates with the secondary unit. For those prior art inventions, the secondary device can only be charged by a dedicated primary device designed for it and charging is only possible if the primary unit is aligned accurately to receive the secondary unit it is designed for.

The contact free power transfer concept as embodied by the transformer inherently requires almost perfect mechanical alignment. The reason for this is that any "magnetic flux leakage" between the primary coil and the secondary coil, namely, the magnetic flux that is generated by the primary coil that is not enveloped by the secondary coil, will be seen by the primary unit as a series leakage inductance. The leakage inductance is directly proportional to both the self inductance of the primary coil and the fractional loss of magnetic coupling between the primary and the secondary. Since the power transfer rate is directly proportional to the primary self inductance as well as to the magnetic coupling coefficient and the frequency of the AC source current, the self inductance of the primary coil must necessarily be high. Hence even a 1% flux leakage will result in leakage impedance that is large enough to practically choke off the primary current. The leakage flux can only be minimized by properly aligning the secondary coil with the primary coil and by using the high permeability core to concentrate and guide the inductive magnetic flux through the volume enclosed by the coils with minimum stray magnetic fields. To further minimize leakage, the air gap between the primary magnetic core and the secondary magnetic core must be kept as small as possible. This explains why an improperly seated inductive toothbrush oftentimes will fail to get charged. The requirement for precise alignment presents a major obstacle to the popularity of such devices.

To surmount the difficulty of transformer-based inductive power transfer, one or more capacitive load may be introduced in series with the primary circuit in order to compensate for the large inductive leakage impedance. This is similar to "power factor correction" for power AC circuits. A switched capacitor bank can be used to adjust the capacitive load to accurately cancel out the inductive load caused by the leakage flux. A primary circuit in which the series capacitive load and series inductive load precisely cancels is called a series resonant circuit. Power transfer that relies on series resonance is appropriately called "resonant inductive power transfer." Such transfer is no longer subjected to the stringent leakage free coupling requirement of the transformer power transfer method.

One prime example of resonant power transfer is the passive RFID tag. Passive RFID tag has no internal power supply. The minute RF current induced in the antenna of the tag by the incoming RF signal provides the power for the tag. The power is rectified and stored in a capacitor. When the voltage of the capacitor reached a threshold value, the capacitor activates the digital memory chip that is given a unique electronic product code. The RFID code is used to modulate the antenna to reflect the continuous RF signal transmitted by the RFID "interrogator" by varying the reflectivity of the antenna. The interrogator detects the changes in the reflected power and demodulates and decodes the received RFID signal. The passive RFID represents a diametrically opposite example to an AC transformer in that the leakage flux is so large that the coupling coefficient is for all practical purpose zero, i.e., very little flux from the primary interrogator coil is linked to the secondary passive RFID antenna coil. Hence the leakage coefficient is virtually 1. In such cases, there is no need of a switched capacitor bank. A single fixed capacitor tuned to the series resonance of the primary circuit is sufficient. Because the coupling coefficient is so small, very little power actually gets transferred between the primary unit (the interrogator) and the secondary unit (passive RFID tag), hence the energy conversion efficiency is extremely poor. However, the main purpose of RFID technology is not to provide power transfer, but to enable the interrogator to briefly power up the passive tag's power unit with just enough energy to transmit back the product code information. The fact that there is power transfer between the primary unit and the secondary unit is just a means to achieve that goal without having to put an energy storage device inside the tag.

Another example of resonant power transfer is the Wacom's wireless tablet technology. A Wacom pen or mouse can be used with their tablets as input devices without the need of any internal power supply such as batteries or supercapacitors. The tablet acts as a primary unit with a multitude of primary coil arranged in a matrix and emits a low power magnetic field whose intensity decreases rapidly away from the tablet. The pen or mouse comprises an antenna and a transponder unit that receives the incoming RF power, rectifies it, and retransmits a RF signal at a different frequency. The retransmitted signal is detected by two or more primary coils that are close to the antenna of the secondary unit. The received signals are used to triangulate the precise location of the secondary antenna. Wacom's technology can be considered as a variation of the RFID technology in its use of a frequency converting transponder. Because of the closeness of the primary coils to the secondary antenna, very little power is required to transmit a beacon signal. Hence, as in RFID, the energy conversion efficiency does not play a role here, and the contactless power transfer is just a means to achieve the goal of precisely locating the battery-less pointing device.

US 20030210106A1 to Lily Ka Lai Cheng et al. discloses a system and method for transferring power without the need for direct electrical conductive contacts between a primary unit and one or more secondary units. A salient aspect of that patent is that the inductive magnetic field lines generated by the primary unit are substantially parallel to the plane of the surface within the laminar active surface of the primary unit, which minimizes the intensity and size of the magnetic field generated to reduce electromagnetic emission. Another salient aspect of that invention is the convenience of being able to allow secondary devices to be placed anywhere within the active vicinity thereby eliminating the need for plugging-in or placing secondary devices accurately relative to an adaptor or charger. A still another aspect of the prior art is the ability of the primary unit to supply power to a number of secondary different devices with different power requirements simultaneously. These are achieved by a unique design of two large base coils that generate magnetic fields which are substantially parallel to the plane of the laminar base surface and are substantially orthogonal to each other in space and time. The localization of the magnetic field is further aided by the use of high magnetic permeability material. This overcomes one of the main problems associated with inductive charging: the generation of large magnetic field profile. Since the intensity of electromagnetic emission is governed by regulatory limits, any device that is capable of generating a large inductive magnetic field profile runs the risk of violating such limits. In addition, numerous objects can be adversely affected by the presence of a large magnetic field, causing them to either be heated or lose precious stored data.

Despite these advances, this prior art approach suffers from two serious limitations: First, although the magnetic field generated by such approach has a low profile, it does not provide a method to localize the magnetic field around the secondary devices. Thus, if a metallic object is placed on or near the active area of the primary device, an eddy current will be induced, causing the metal to heat up, with a like effect on the primary unit, which sees the metallic object as an equivalent short, which may lead to irreparable damage to the primary unit. Second, the height of the magnetic field profile for the primary unit is directly proportional to the linear dimensions of the primary unit because of the similarity principle. Hence the concept can't easily be scaled up to large primary devices without exceeding regulatory limits. To date, the assignee of that patent, Splashpower limited, has demoed only small, mouse-mat-sized pad that can support up to two small power devices such as PDAs and cell phones simultaneously. Splashpower's devices have also suffered from low energy conversion efficiency.

Another approach to avoid the generation of large magnetic fields is to use an array of coils whereby only a few of them are activated as need arises. This was suggested by a paper published in the Journal of the Magnetics Society of Japan entitled "Coil Shape in a Desk-type Contactless Power Station System" (Nov. 29, 2001). In one embodiment of the concept, multiple position sensors sense the presence of a secondary device placed on the primary unit and relay that information to a central controlling unit. The control unit then sends power to the appropriate coils to energize the secondary coil in a localized fashion. The degree of localization of the magnetic field is determined by the number of primary coils. Since each coil requires a dedicated high frequency switching unit to activate or deactivate, and the central controller unit needs to have an input pin and an output pin for every coil, the complexity increases drastically as the number of primary coils increases.

The prior art solutions invariably use low induction frequencies in the audio frequency range (1 KHz to 50 KHz). The advantages of such solutions include the ready availability of power generation devices in this frequency range as well as the existence of very high magnetic permeability materials which can increase the induced magnetic flux drastically by offering a low reluctance path for the induction magnetic field, thereby increasing the power transfer. The drawbacks of the prior art approaches are: First, the power generation devices are typically bulky because of the need to use large inductors and capacitors at such low frequencies as well as the relatively large current requirement. Second, the high magnetic permeability materials typically have rather large loss tangent, and have nonlinear and hysteretic behaviors at large magnetic flux intensities. Further, the strong reliance of the prior art approaches on the use of high permeability materials in order to reduce the bulkiness of both the primary and the secondary device means that the only major high magnetic reluctance circuit resides within the air gap between the primary and the secondary devices. The consequence is that the power transfer decreases rapidly as a function of the air gap, rendering the prior art technologies no better than the prior art solution based on direct electrical contact in their ability to tolerate vertical separation. Fourth, in order to enable the power transfer through the air gap, the inductive magnetic flux through the air gap must be sufficiently large owing to the relatively low induction frequency. This is because the power transfer is proportional to the product of the induced voltage and the induced current, and the induced voltage is in turns proportional to the rate of change of magnetic flux linked. In other words, the induced voltage is proportional to the product of the driving frequency and the linked magnetic flux.

Within the air gap, the relative magnetic permeability is 1; hence the magnetic field strength within the air gap cannot be reduced by the presence of high permeability material elsewhere. Since the lower the driving frequency, the larger the magnetic field required for a given power transfer rate, this means that low frequency inductive power transfer necessarily entails a severe size/power tradeoff, namely, for a given size of the induction coil, there is a power limit. For audio frequency inductive methods, the power limit for an inductive coil that can fit into a typical cell phone is limited but sufficient to charge a cell phone. The situation gets worse for larger devices such as a notebook computer which often requires 20-40 times more power to charge its battery but lacks space for a coil large enough for that purpose.

The inability of the majority of prior arts to localize the inductive field presents thorny interference and safety issues, as well as energy conversion efficiency issues. The danger that is inherent in having stray magnetic flux that can cause metallic objects in its vicinity to heat up, no matter how slowly is a major safety hazard. An user wearing a ring on his or her finger, or having a metallic implant, is liable to have induced eddy current in and around his/her body. The electromagnetic interference caused by such stray field can also severely hamper the proper operation of a sensitive electronic device. Lastly, the presence of nonlocalized field which does not couple to client devices drastically reduce the energy conversion efficiency since the Q factor of the primary coil is not infinity in practice, hence the portion of the current that is responsible for the generation of such stray flux will always have a resistive component. The larger the unlinked flux, the higher the dissipation loss. Worse, the magnetic flux does not diminish even in the absence of any client devices in the active vicinity; hence the standby power consumption represents a 100% power loss.

Even though each of the aforementioned problems can be solved in theory, the solutions invariably increase system complexity and drive up cost as well as making the system less reliable and less user-friendly. The hazard associated with the presence of metallic objects in the vicinity of the primary device, for example, can be solved through the use of a proximity metal detector. The energy conversion efficiency can theoretically be improved by using conducting materials with very low resistivity such as room temperature superconductors, etc. The EMI interference issues can exemplarily be addressed by either limiting the size of the primary surface, or by switching micro-coils, as was suggested in the aforementioned Japanese paper (Nov. 23, 2001). The no-load power loss can be addressed by automatically turning off the power to the primary coils when no devices have been detected, and is only turned back on when at least one device has been detected. The detection of an eligible device can be performed by embedding a RFID in a device so that a RFID reader in the primary device can read the RFID tag to identify compatible client devices on the primary surface. The absence of any RFID signature will allow the primary unit to go to a standby mode with no electromagnetic emission.

Although a metal detector will make the prior art system safer, it significantly limits how the prior art system can be used. For example, a nearby metallic object will cause the primary device to go to a standby mode immediately, terminating the power transfer; hence the sensitivity of the metal detector must be tuned carefully to ensure that its envelope more or less coincides with that of the active region of the primary device. This way, a distant metallic object won't trigger an unnecessary shutdown. Even then, any small metallic object that accidentally falls on the primary surface will have to be removed, which is clearly a big annoyance. Worst, if an object such as steel wool whose metallic content is insufficient to trigger the metal detection happens to be on the primary surface, it may still be able to couple to the inductive magnetic field to generate a small Eddy current which causes it to slowly get hot enough to create a fire hazard. Similarly, if the sensitivity and range of the RFID reader is not properly tuned, it may either be unable to detect an eligible client device and therefore fails to turn on the primary coils, or there may be a client device that is too far to be charged by the primary device and yet close enough to be identified by the RFID reader to prevent the primary device from going to the standby mode.

SUMMARY OF THE INVENTION

In one embodiment, a system is provided for the inductive transfer of electric power between a primary surface and a multitude of secondary devices in such a way that the power transfer is localized to the vicinities of individual device coils. In one embodiment, such power transfer occurs without the need of complex high frequency power switching network to turn the individual primary coils on or off. In one embodiment, a modular way to provision power is provided.

In one embodiment, the inductive transfer of electric power between a primary surface and a multitude of secondary devices is unaffected by the presence of conductive or metallic objects either in direct contacts or in the vicinity of the primary inductive field to ensure that such power transfer can take place safely and uninterrupted.

In one embodiment, the inductive transfer of electric power between a primary surface and a multitude of secondary devices does not produce significant electromagnetic interference to sensitive electronic devices in the vicinity of the primary surface.

In one embodiment, the inductive transfer of electric power between a primary surface and a multitude of secondary devices does not require the use of expensive high magnetic permeability materials.

In one embodiment, a uniform inductive coupling between the primary device and the multitude of secondary devices is maintained in a uniform manner within the active region of the primary device.

In one embodiment, electric power is to be transferred in a contactless fashion comprising a primary unit and a multitude of secondary units, wherein the primary unit is a thin device with a laminar surface and a multitude of substantially flat induction coils embedded just underneath the laminar surface interconnected in parallel by a primary feed network, the multitude of conductive coils being accompanied by a multitude of counterbalance capacitors to reduce or substantially cancel out the primary current that flows in the primary feed network in areas where secondary units are absent.

In one embodiment, a multitude of counterbalance capacitors has a one-to-one relationship with the multitude of primary coils, with each primary coil being mated to the closest counterbalance capacitor. In this way, whenever a secondary unit is placed or held in close proximity to said primary coil, the counterbalance relationship between the primary coil and the matching capacitor is broken, leading to an increase in primary current to both the capacitor and the primary coil to effect a local transfer of electric power from the primary coil to the secondary unit.

In one embodiment, the plurality of primary coils is separated into four interweaving sets of coils which together form a 2-dimensional periodic pattern. The coils are driven by a 4-phase quadrature drive to generate a diagonally traveling induction field pattern. Alternatively, the plurality of coils can also be driven by other multi-phase driver such as a 6-phase driver to better simulate a traveling sine wave for the induction field. When a secondary unit is placed on or near the primary surface, the secondary unit will experience a sinusoidal inductive magnetic field irrespective of the location of the secondary unit relative to that of the primary unit. The closer the primary induction field resembles a traveling sine wave field, the more nearly constant the inductive electromotive forces which the secondary unit sees as a function of its position, and hence the more uniform is the power transfer. Note that a 4-phase driver can be constructed from just two mutually orthogonal phases, and a 6-phase driver can be built out of two phases that are 120° apart.

In one embodiment, there is provided a primary unit for transferring power wirelessly, wherein the primary unit includes at least one bank of switched capacitors that is adapted to adjusting the source impedance of the RF drive to match the impedance of the effective load of one or more secondary units that are coupled to the primary unit for the purpose of minimizing the reflected RF power, and thereby minimizing the heat generation on the RF power supply side when there is a load impedance-source impedance mismatch. Alternatively, the switched capacitor bank can be replaced by any other means of adjusting the capacitance value of a high voltage network electronically, such as a MEMS capacitor which can vary its capacitance by electrostatically varying the air gap between adjacent metallic membranes under analog or digital control.

In one embodiment, there is provided a primary unit for transferring power wirelessly, wherein the primary unit includes a load monitor which monitors the effective primary load impedance of secondary units to provide the needed feedback to the aforementioned source impedance matching means, as well as to act as a load sensor which provides the signal to switch the primary unit into the sleep mode when no secondary units are loaded.

In one embodiment, there is provided a primary unit for transferring power wirelessly, wherein the primary unit comprises a sleep mode of operation triggered by the absence of measured load and can return to normal operation by periodically waking up to operating mode to test the existence of secondary units. Alternatively the secondary units can generate keep-alive signals periodically by modulating the input impedance or by direct RF signal generation to either wake up the primary unit from sleep mode, or to prevent the primary unit from going into the sleep mode.

In one embodiment, there is provided a secondary unit for receiving power wirelessly, wherein the secondary unit includes a coil for coupling to the induction field of the primary unit. The coil is substantially flat and can comprise a single turn or multiple turns depending on the load resistance of the secondary unit, the voltage and/or current requirements.

In one embodiment, there is provided a secondary unit for receiving power wirelessly, wherein the secondary unit includes a variable capacitor means which provides an electronically adjustable capacitance for the purpose of matching the resonant frequency of the secondary receiving circuit with the drive frequency of the primary unit. The variable capacitor means can be a switched capacitor bank under the control of an analog or digital controller, or could be MEMS based variable capacitors.

In one embodiment, there is provided a secondary unit for receiving power wirelessly, wherein the secondary unit includes a fixed or programmable controller for regulating the received RF voltage through resonant frequency tuning by controlling the variable capacitor to tune in or out of the primary RF drive frequency.

In one embodiment, there is provided a secondary unit for receiving power wirelessly, wherein the secondary unit includes a rectifying circuit to convert the RF power into DC power to provide the power for the device served by the secondary unit. The rectifying circuit can be a simple full bridge passive rectifying circuit, or it could be an active synchronous rectifying circuit with reduced forward voltage drop to improve rectification efficiency.

In one embodiment, there is provided a secondary unit for receiving power wirelessly, wherein the secondary unit includes a signaling means for sending keep-alive signals periodically to the primary unit to prevent the primary unit from going to a sleep mode and to wake up the primary unit from a sleep mode.

In one embodiment, there is provided a secondary unit for receiving power wirelessly, wherein the secondary unit includes a proportional, integral, differential (PID) controller which takes the difference between the set voltage and the rectified DC voltage as the error signal and outputs a control signal or control vector to adjust the capacitance value to tune the resonant circuit so as to regulate the rectified voltage. This allows the secondary unit to provide the correct voltage or other power requirements to the device that is powered by the secondary unit.

In one embodiment, there is provided a secondary unit for receiving power wirelessly, wherein the secondary unit includes a transformer which transforms the RF voltage to a voltage more suitable for rectification to the desired output voltage for powering the device associated with the secondary unit.

In one embodiment, there is provided a secondary unit for receiving power wirelessly, wherein the secondary unit includes a RF shield surrounding the RF section of the secondary unit which is made of thin metallic film for the purpose of blocking the RF induction field to prevent it from interfering with the proper functions of the device associated with the secondary unit as well as minimizing parasitic coupling between the secondary coils and the metallic or electronic components of the associated device which would otherwise alter the resonant behaviors of the secondary RF circuit.

In one embodiment, there is provided a secondary unit for receiving power wirelessly, wherein the secondary unit includes a frequency translation and retransmission means which shifts the received RF frequency to a different frequency and retransmits it after it has been modulated with data. The primary unit can receive the retransmitted signal, use a Bandpass filter to filter out unwanted signals and demodulate and decode the RF signal to recover the data.

In one embodiment, there is provided a secondary unit for receiving power wirelessly, wherein the secondary unit includes a voltage multiplication means which can increase the received RF voltage to a value that is sufficient to power the PID controller to tune the resonant frequency to the primary drive frequency even though the default frequency of the secondary unit is too far from the pre-set value to allow strong enough induction voltage to power the PID controller. The voltage multiplication means jacks up the voltage so that, after rectification, the voltage is sufficient to power the PID controller. This increases the system's tolerance to detuning of the secondary unit when the secondary unit is not connected to an energy storage means such as a rechargeable battery.

DETAILED DESCRIPTION OF THE PREFERRED EMBODIMENT

In the following detailed description of the present invention, certain specific details are set forth to facilitate a thorough understanding of the principle concepts that is contained within the present invention. It will become obvious, however, to those skilled in the art that the present invention may be practiced without those specific details. In other instances, well-known methods, procedures, materials, components and circuitry have not been described in detail to avoid unnecessary obscuring aspects of the present invention. The detailed description focuses only on presenting a self-contained explanation with sufficient depth to cover certain simplified and idealized representations or embodiments of the present invention in order to elucidate the inventive concepts. These descriptions and representations are the means used by those experienced or skilled in the art to concisely and most effectively convey the substance of their work to others skilled in the art.

Specific terminology will be resorted to in describing the present invention for the sake of clarity and it is not intended for the present invention to be limited to the specific terms so chosen. Furthermore, it is to be understood that each specific term comprises all its technical equivalents that operate in a broadly similar manner to achieve a similar purpose. Reference herein to "one embodiment" or an "embodiment" means that a particular feature, structure, or characteristics described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of process flow representing one or more embodiments of the invention do not inherently indicate any particular order nor imply any limitations of the invention.

Figure 1:
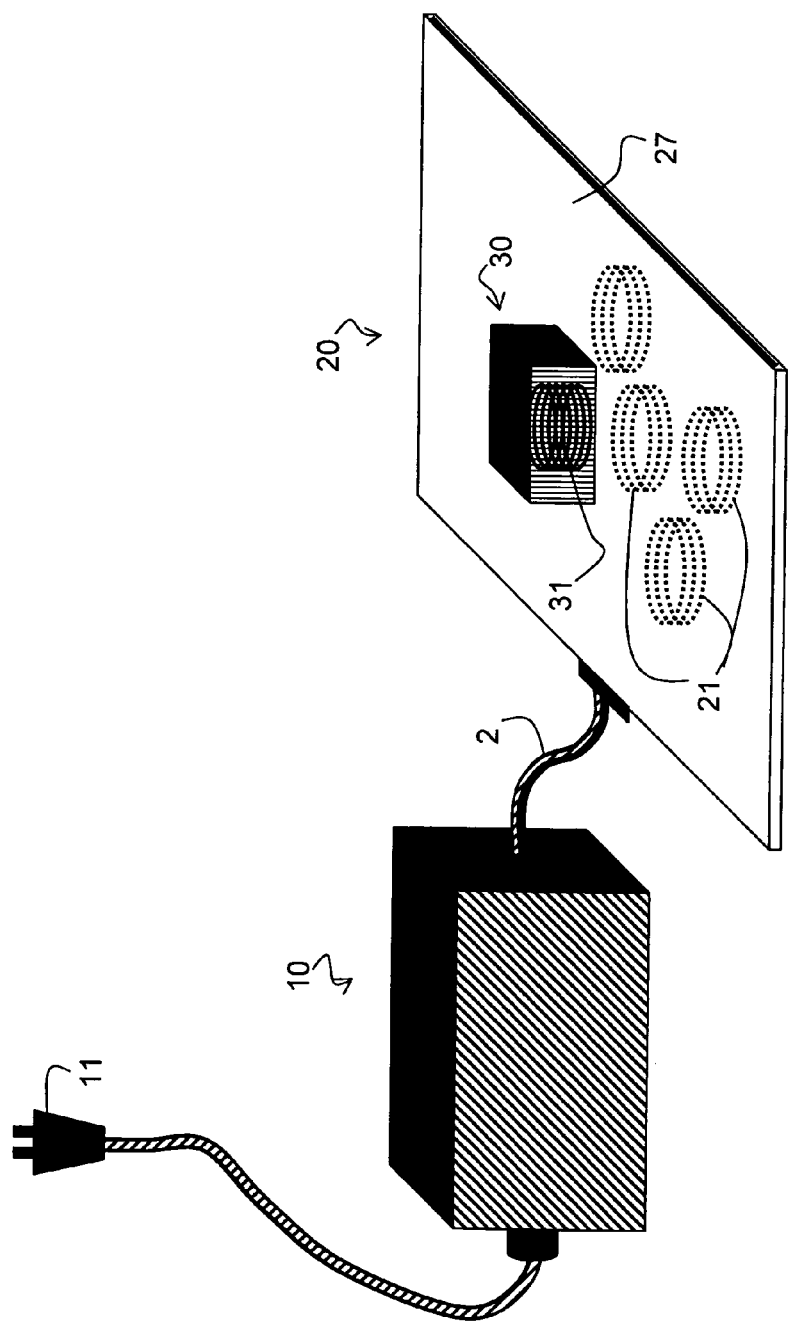
FIG. 1 is an isometric view, of a system of the subject invention shown during the process of wireless power transfer between a primary unit and a secondary unit in accordance with one embodiment.

Turning now to the drawings, FIG. 1 shows an isometric view, of a system of one embodiment invention during the process of wireless power transfer between a primary unit 20 and a secondary unit 30. The primary unit converts the DC power supplied by a conventional DC power supply 10 connected to an AC outlet 11 to a multitude of radio frequency oscillations. The various RF oscillations can be of different RF frequencies, or they could all have the same frequency. The RF signals are used to drive a set of primary coil arrays which are in general two dimensional in nature to generate inductive magnetic field above a substantially laminar surface 27 in which the primary coils 21 are embedded. When a device with a device adapter equipped with one or more secondary coils 31 which can resonate with the inductive magnetic field excited by the primary coils 21, the RF power is transferred from the primary unit 20 to the secondary unit 30 by a RF cable 2. The transferred RF power is subsequently conditioned and rectified by the rectification circuit within the secondary unit 30 into a regulated DC power with a substantially constant voltage. The regulated DC power is then used to power the device to perform such tasks as charging a secondary battery, or to be used directly by the device to power its electronics, etc.

Figure 2:
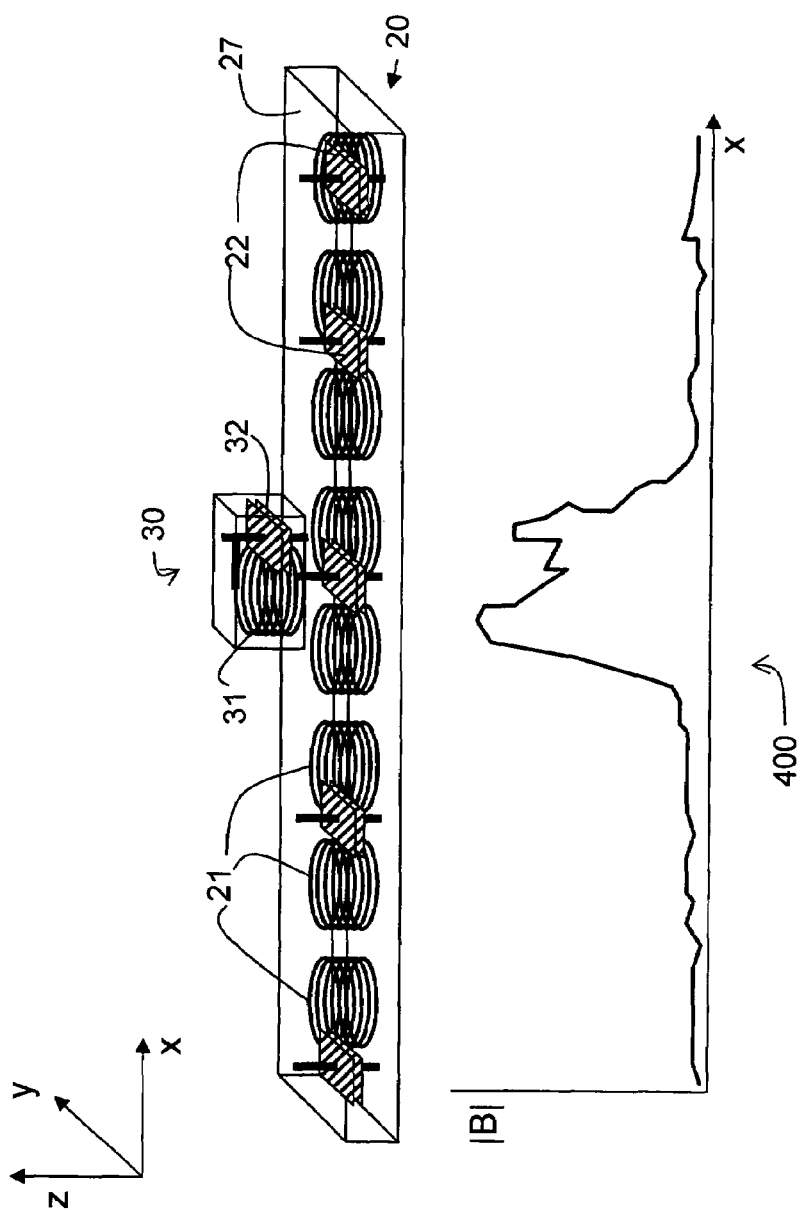
FIG. 2 is an isometric view of a single array of inductive field coils of the primary unit together with a single coil of the secondary unit, as well as the localization of the inductive field when the secondary coil is brought close to the primary unit in accordance with one embodiment.

FIG. 2 depicts an isometric view of a single array of inductive field coils 21 of the primary unit 20 together with a single coil 31 of the secondary unit 30. It also illustrates the localization of the inductive field when the secondary coil 31 is brought close to the primary unit 20 (see the |B| profile in 400). The self-induced localization of the inductive magnetic field of the primary unit arises from both the local resonance nature of the primary RF circuit, and from the adaptive circuitry that resides in the secondary unit 30. The primary unit has a local parallel LC (inductance 21-capacitance 22) balanced architecture to present a large primary load impedance to the RF power supply. Anytime the LC balance is strongly altered in any local region, the parallel LC impedance decreases drastically to allow primary RF load current to flow into the local region. When a secondary unit 30 is placed anywhere on the top surface 27 of the primary unit 20, the resonance circuitry within the secondary unit 30 couples to the local LC circuit of the primary unit 20, and together, they form a new local resonance substructure. In order for the new local resonance substructure to tune in to the applied RF frequency, the secondary unit 30 must adaptively adjust its own self impedance to pull the resonance in. The need of an adaptive component in the secondary unit 30 also means that it would be nearly impossible for any incompatible electronic device or a foreign object such as a metal bar, low reluctance magnetic material, or saline water to shift the local resonance enough to cause even a minute amount of power transfer. This greatly contributes to the safety of the present invention.

Figure 3:
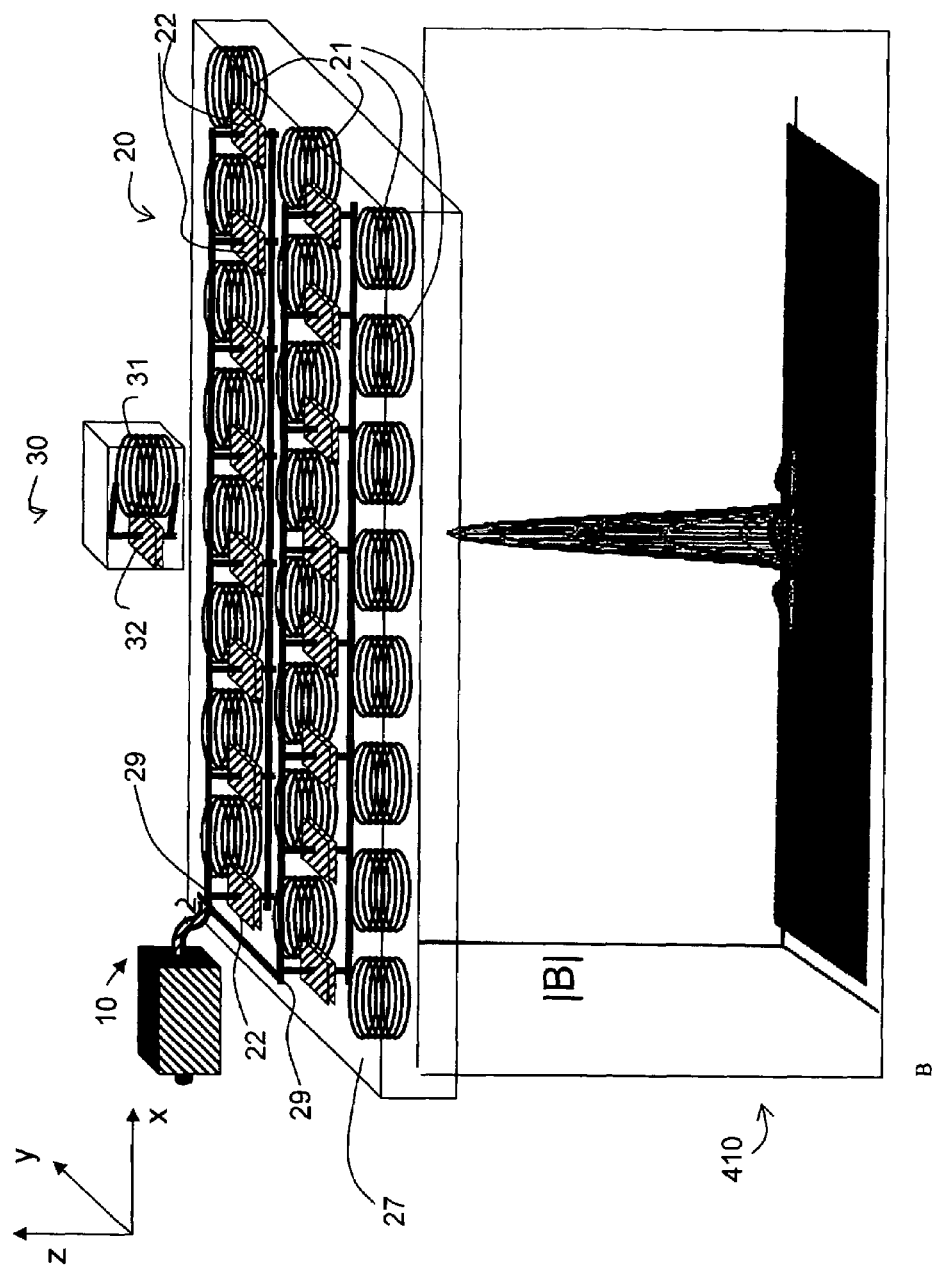
FIG. 3 is an isometric view of the primary unit which comprises a two-dimensional array of primary coils and attendant matching capacitors as well as the power rails for connecting the primary coils and capacitors to the primary RF power supply in accordance with one embodiment.

FIG. 3 is an isometric view of the primary unit 20 which comprises a two-dimensional array of primary coils 21 and attendant matching capacitors 22 as well as the power rails 29 for connecting the primary coils 21 and capacitors 22 to the primary RF power supply 10. The primary coils 21 are arranged in groups such that coils 21 from one group do not have strong coupling to coils 21 from another group because of the way each group is driven by the RF source, and neighboring coils 21 from the same group likewise are only weakly coupled because of the physical and geometrical constraints. Each compensating capacitor 22 is placed in such a way that it can match the impedance of either a single primary coil 21 or a set of neighboring primary coils 21 to form a local parallel LC network. At its resonance frequency (or, more properly, the anti-resonance frequency, since the complex impedance of the parallel LC network has a pole in the complex frequency plane. Henceforth we will use the terms resonance and anti-resonance interchangeably to describe the impedance of a parallel LC network for simplicity, with the understanding that when a resonance is referred to a parallel LC network, it actually means anti-resonance), the LC network exhibits nearly infinite impedance to the RF source, hence the primary load current through such network is normally blocked provided that all the local LC networks are tuned to the primary driving frequency. Therefore, if no secondary unit 30 is placed in the vicinity of such a network, the amount of load current flowing through it is at its minimum.

When a compatible secondary unit 30 sits on top of the primary surface 27, the parallel LC resonance frequency is shifted away from the driving frequency of the RF source 10, which, in turns, causes the effective local LC impedance to decrease sufficiently to enable the load current to flow into the local LC network. The receiving coil in the secondary unit 30 likewise has a compensating capacitor 32 in parallel with the receiving induction coil 31. The act of bringing the secondary unit 30 close to one or more of the local LC networks of the primary unit 20, the inductive coupling is established between the primary unit 20 and the secondary unit 30. This mutual inductive coupling creates a new local resonance substructure with its own resonance and anti-resonance frequencies. The increase in the local load current in turns results in the increase in the local magnetic field intensity which is shown in Graph 410. The compensating capacitor 32 in the secondary unit 30 is electronically adjustable. By varying the compensating capacitance of the secondary unit 30, the resonance frequency of the combined local resonant network can be changed.

Figure 4:
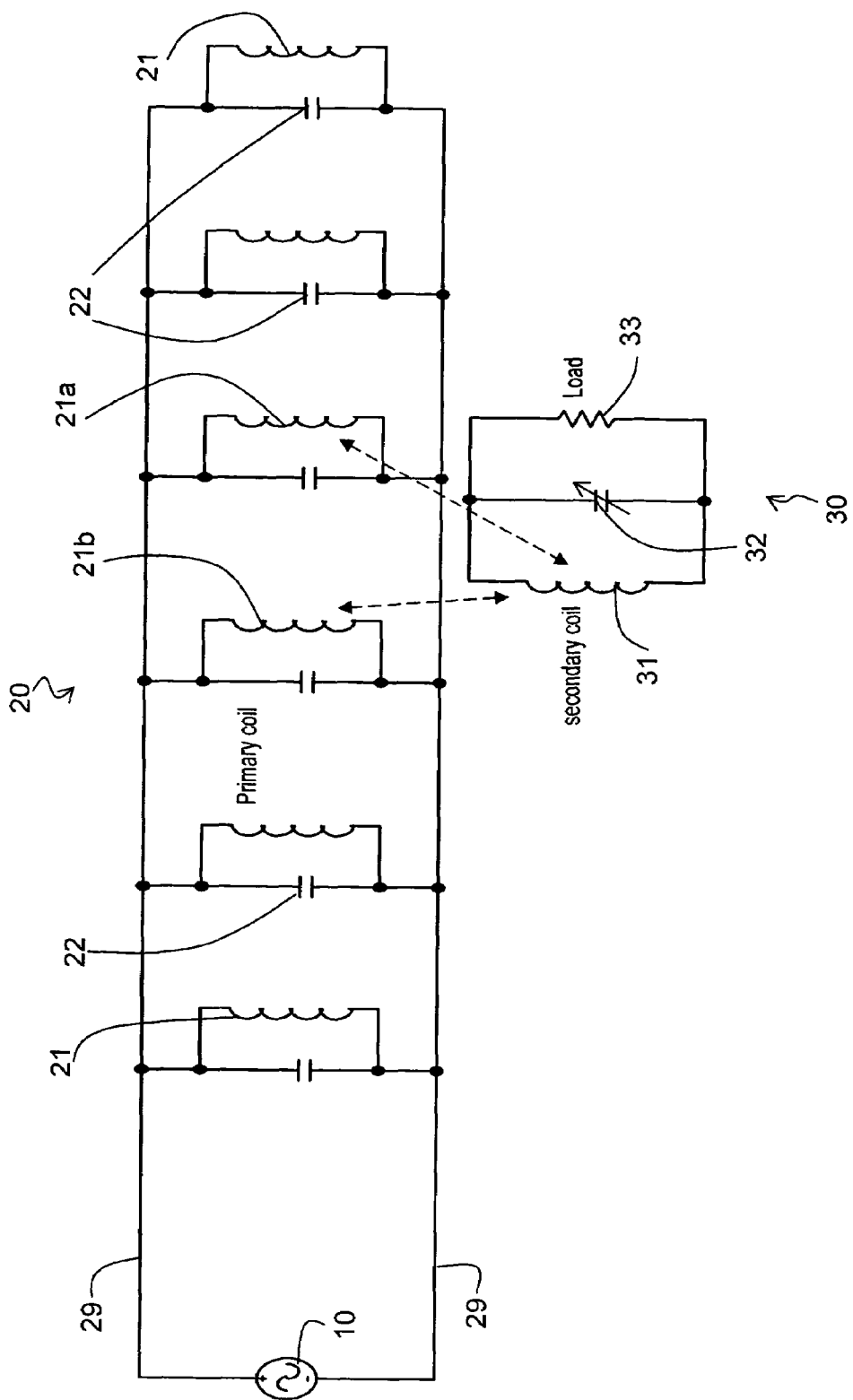
FIG. 4 is a schematic view showing the interaction between the primary induction coils of the primary unit and the receiving coil of the secondary unit in a simplified single primary coil array system for illustration purpose in accordance with one embodiment.

FIG. 4 is a schematic view showing the interaction between the primary induction coils 21 of the primary unit 20 and the receiving coil 31 of the secondary unit 30 in a simplified single primary coil array system for illustration purpose. As shown, the primary unit 20 comprises a linear array of parallel LC networks all connected in parallel by the two RF feed rails 29. Alternatively, the number of matching capacitors 22 can be reduced by using one capacitor 22 to balance the load impedance of several neighboring inductive coils 21. In the extreme case, a single capacitor 22 can be used to balance the entire primary coil array. The last case corresponds to a global impedance compensating scheme.

In the more local impedance compensating geometry, there is very little load current that flows through the RF feeder rails 29 during standby phase. As the impedance compensation becomes progressively more global, there is a corresponding increase in the standby load current flowing in the feeder rails 29. This is because the compensating capacitor 22 only blocks the load current that flows into the effective parallel LC network, but not the current that is internal to the effective parallel LC network. The RF load current in the feeder rails 29 introduces unwanted stray inductive magnetic field which increases ohmic heating, making the global compensation less desirable for large primary surfaces 27. However, for smaller primary surface 27, the need for local compensation is diminished.

The secondary unit 30 comprises a receiving coil 31 in parallel with a matching capacitor 32. The device that the secondary unit 30 is attached to is simplistically represented by a resistive load 33 in series with the parallel LC network formed by the receiving coil 31 and the matching capacitor 32. The variable nature of the capacitor 32 is indicated by the arrow across the capacitor symbol 32. When the secondary unit 30 is brought to the proximity of the primary surface 20, a mutual coupling is established between the secondary coil 31 and one or more of the proximal primary coils 21. The matching capacitance of the secondary unit 30 is chosen so that its default value is at or near the value needed for a parallel LC resonance at the operating frequency of the primary unit 20. The magnetic coupling of the primary coils 21 to the secondary coil 31 is greatly enhanced by such a resonance structure of the secondary unit 30.

Figure 12:
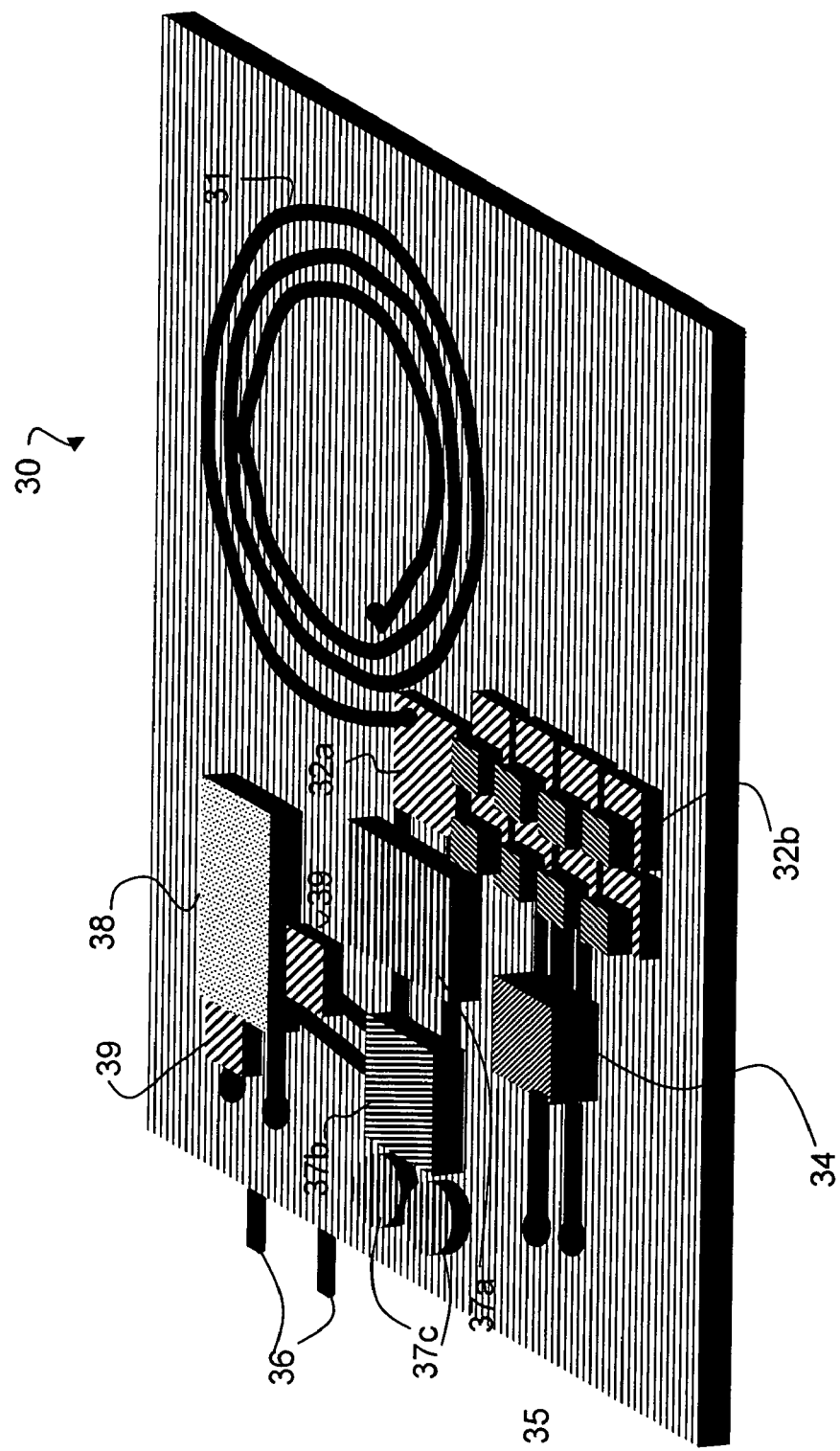
FIG. 12 is an isometric view of the secondary coil and circuit elements in the device adapter in accordance with one embodiment.
Figure 13:
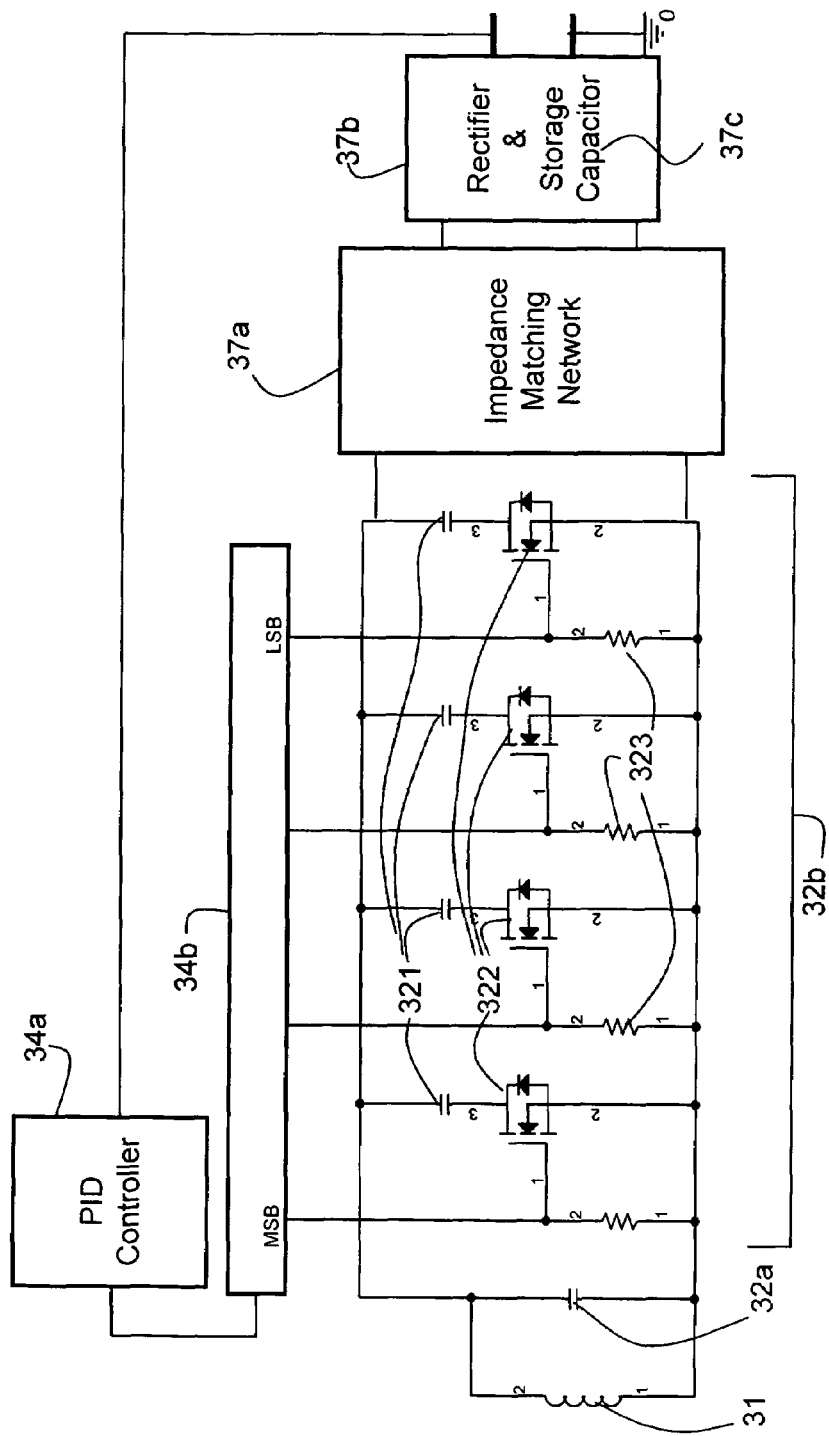
FIG. 13 is a more detailed schematic view of the secondary coil and circuit elements in the device adapter in accordance with one embodiment.

The resonance enhanced coupling drastically altered the local load impedance of the combined network, which in turns shifts the primary local parallel LC resonance away from the operating frequency of the primary RF source 10. Perhaps more importantly, the resonant coupling introduces additional complex zeros and poles of the effective primary load impedance. Furthermore, the additional zeros and poles (or resonances and anti-resonances) are all clustered together around the original resonance frequency which is taken to be the operating frequency of the primary unit 20. By varying the secondary capacitance, the dominant zero of the combined local network can be tuned to the driving frequency of the primary unit 20, which in turns varies the magnitude of the RF voltage across the secondary load 33. This makes it possible to regulate the load voltage of the secondary unit 30 using a feedback control scheme. The feedback control loop continuously monitors the output voltage (usually the rectified DC voltage after the rectification stage that is needed to convert the RF power into DC power to power an electronic device, instead of the un-rectified RF voltage) and compares it to a reference voltage. The deviation of the output voltage from the reference voltage is the error signal which is fed to a controller. The controller output a control signal which adjusts the capacitance value of the secondary RF matching capacitor 32 to tune the resonance frequency of the combined local resonance network either toward or away from the primary operating frequency in order to bring the output voltage close to the reference voltage. The details of the resonance tuning and output voltage regulation will be elaborated later when FIG. 12 and FIG. 13 are discussed.

Figure 5:
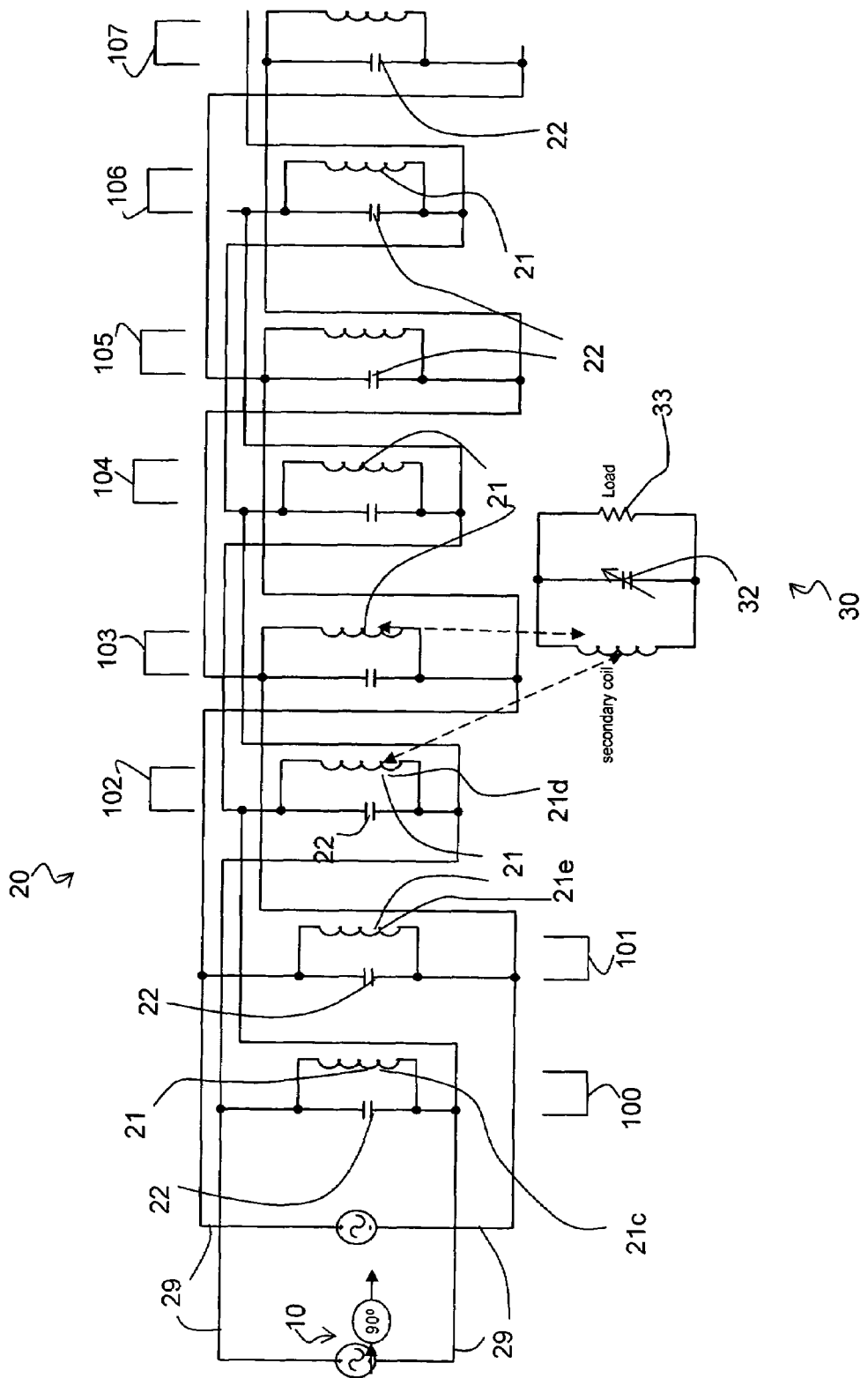
FIG. 5 is a schematic view of an alternative embodiment of the primary coil array driven by two coherent RF sources which have a 90° phase difference, showing the interaction between the primary induction coils of the primary unit and the receiving coil of the secondary unit in a simplified single primary coil array system for illustration purpose in accordance with one embodiment.
Figure 8:
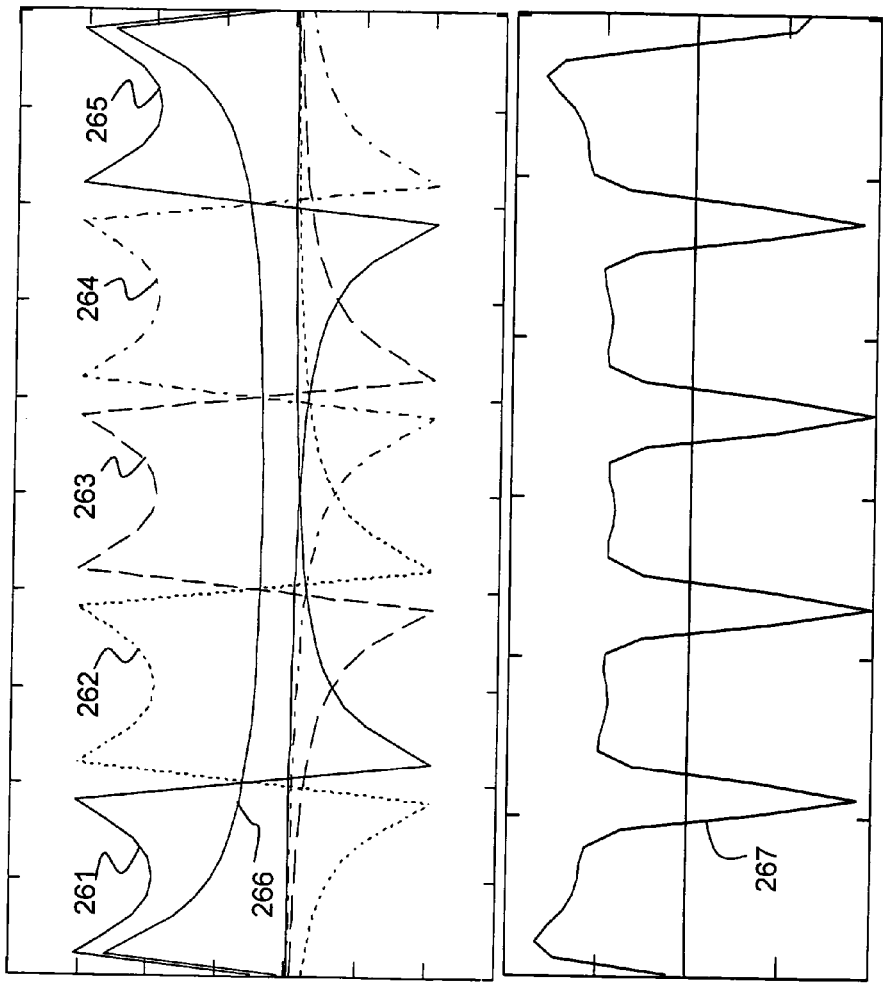
FIGS. 8a and b shows the magnetic fields for a linear array of five coils and the total magnetic field when all five coils are energized in phase by currents of equal amount in accordance with one embodiment.

FIG. 5 is a schematic view of an alternative embodiment of the primary coil array driven by two coherent RF sources 10 which have a 900 phase difference, showing the interaction between the primary induction coils 21 of the primary unit 20 and the receiving coil 31 of the secondary unit 30 in a simplified single primary coil array system for the purpose of elucidating the innovative concepts. This alternative embodiment overcomes a serious problem that arises from the way primary coils 21 are driven in the previous embodiment as described in FIG. 4. In the previous RF driving arrangement, the coils are all driven in phase. Now the nature of the magnetic field generation by the individual primary coil 21 is such that the axial component of the magnetic field changes sign as it crosses from the interior of the coil 21 to the exterior through the coil boundary. It thus follows that there is a great deal of negative mutual inductive couplings between two adjacent primary coils 21a and 21b. When they are driven in phase, the inductive magnetic field generated by one coil 21a tends to oppose the field generated by the other coil 21b. For this reason the inductive magnetic field from one coil 21a is largely canceled by the fringe magnetic field generated by the adjacent coil 21b. When all the primary coils 21 are activated in phase, the combined magnetic field strength is drastically reduced relative to the magnetic field strength of a single coil 21a because of the mutual cancellation effect. The effect is most serious near the center of the primary coil array where cancellation effect is the largest. A graphic depiction of such cancellation effect is shown in FIG. 8.

The highly non-uniform magnetic field distribution is clearly one drawback of the same-phase driving geometry since this would implies that the magnetic field strength at the maximum point will be excessively high if the magnetic field minimum has to be above a certain threshold value in order to provide effective inductive power transfer over the entire active area of the primary surface 27. And since the field strength reduction at the center of the coil array depends strongly on the number and sizes of the primary coils 21, the ability to scale up to larger primary surface area is severely hampered. Worst, owning to the fact that the inductive coil is made up of wire or trace of finite physical dimensions, and wires or traces between two adjacent coils 21a and 21b need to have a finite separation distance, the magnetic field between two adjacent coils 21a and 21b actually can become negative, i.e. point in a direction which is the reverse of the direction of the main magnetic field. As the magnetic field generated by the coil 21 varies in strength in inverse proportionality to the distance between it and the wire or trace that carries the RF current, the magnitude of such reverse magnetic field can be rather large. The upshot of this is that for certain small size secondary receiving coils 31, the inductive coupling can actually go to zero. This occurs when there the total magnetic flux that is enclosed by the secondary coil 31 becomes zero as there are equal amount of positive and negative magnetic fields passing through the secondary coil 31 when the secondary coil 31 is positioned right along the border between the main field region and the reverse field region.

Figure 9:
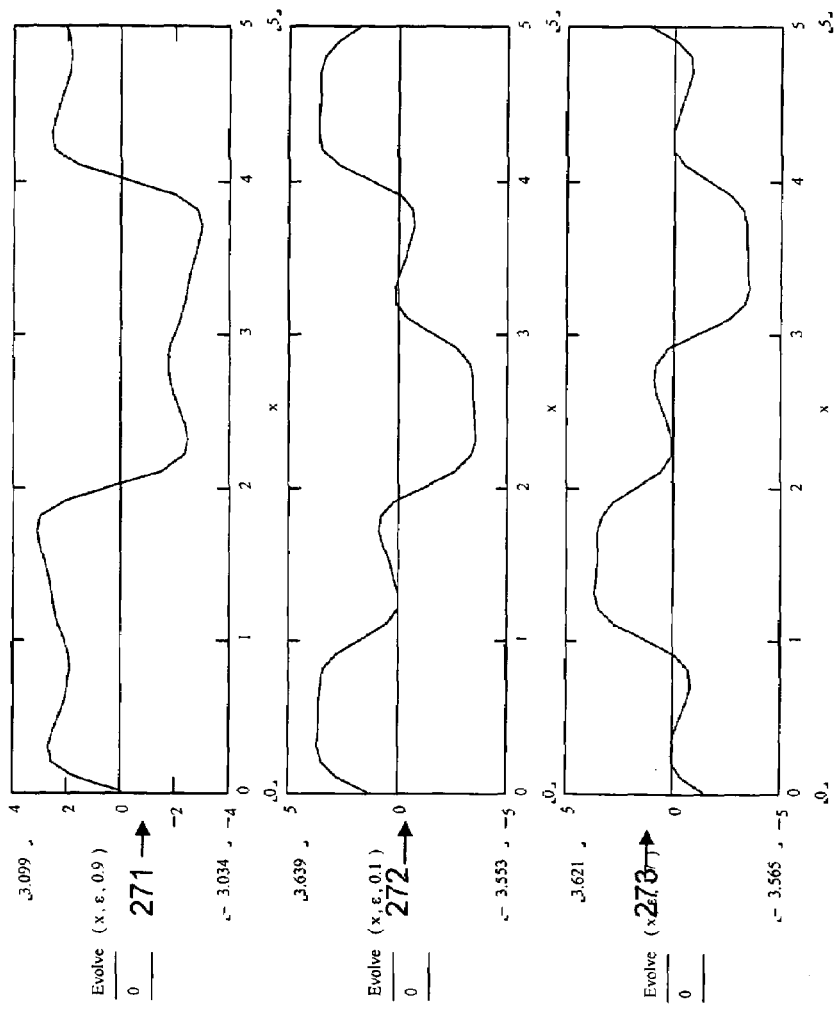
FIG. 9 displays a time sequence of magnetic field intensity to depict the traveling wave nature of the magnetic field excited by a long linear array of coils driven by the circuit shown in FIG. 5 in accordance with one embodiment.
Figure 10:
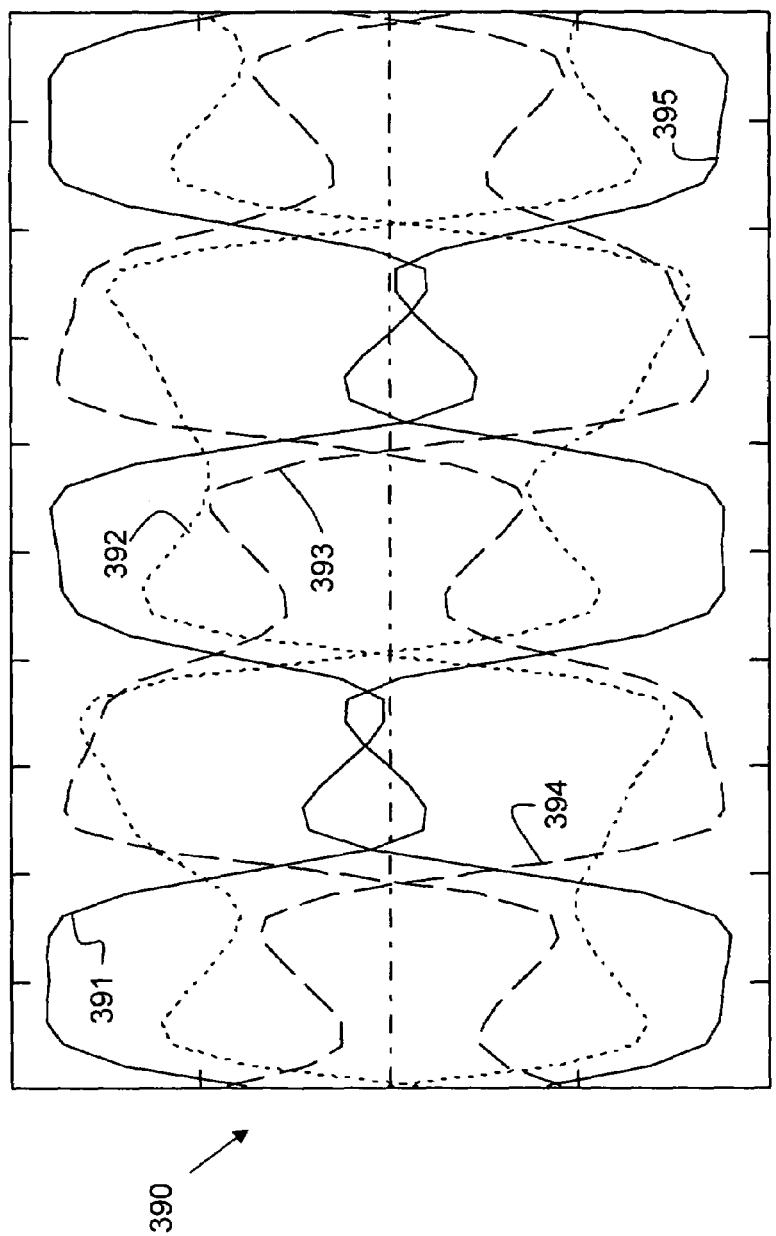
FIG. 10 shows the magnetic fields excited by a long linear array of primary coils at various times in accordance with one embodiment.

These drawbacks are overcome by dividing the primary coils 21 into two interleaving subgroups and drive the member of each subgroup with one of the four phases in a four phase drive scheme. For example, coil-capacitance network 100 is driven with an in-phase RF driver. Coil-capacitance network 101 is driven with a 900 quadrature phase driver. Coil-capacitance network 102 is driven by the same in-phase driver as coil-capacitance network 100 but in reverse, and coil-capacitance network 103 is driven by the quadrature phase driver in reverse. Coil-capacitance networks 104, 105, 106 and 107, etc. are driven in turns by the same phase sequence over and over again until there is no more coil left. Within each subgroup, any two nearest coils are separate roughly by the diameter of one primary coil 21, assuming all coils 21 are equal in size. Due to the fact that the stray return magnetic field diminishes in strength fairly quickly away from the coil, the two nearest coils 21c and 21d within the same subgroup will have almost negligible mutual inductive couplings because of the physical separation. Adjacent coil coupling is also drastically reduced by virtual of the fact that tow adjacent coils 21c and 21e belong to different subgroups. And except at the edges of the primary array, a coil belonging to one subgroup, such as 21e is always flanked by two coils belonging to the other subgroup, such as 21c and 21d. Consider Coil-capacitance networks 102, 103 and 104, for example; Coil-capacitance networks 102 and 104 are driven 1800 out of phase, hence the negative mutual inductance from 102 to 103 is substantially canceled by the positive mutual inductance from 104 to 103. Thus it follows that 103 is essentially uncoupled from the subgroup that coil-capacitance networks 102 and 104 belong to. Thus the 900 driving geometry by and large decouples the coils 21 from one another. This drastically diminishes the non-uniformity of the magnetic field except near the edge of the primary active surface. It also makes scaling up to larger surface a trivial task because of the substantially uncoupled nature of the primary coils 21. FIG. 9 and FIG. 10 describe the issue of coupling uniformity further.

Figure 6:
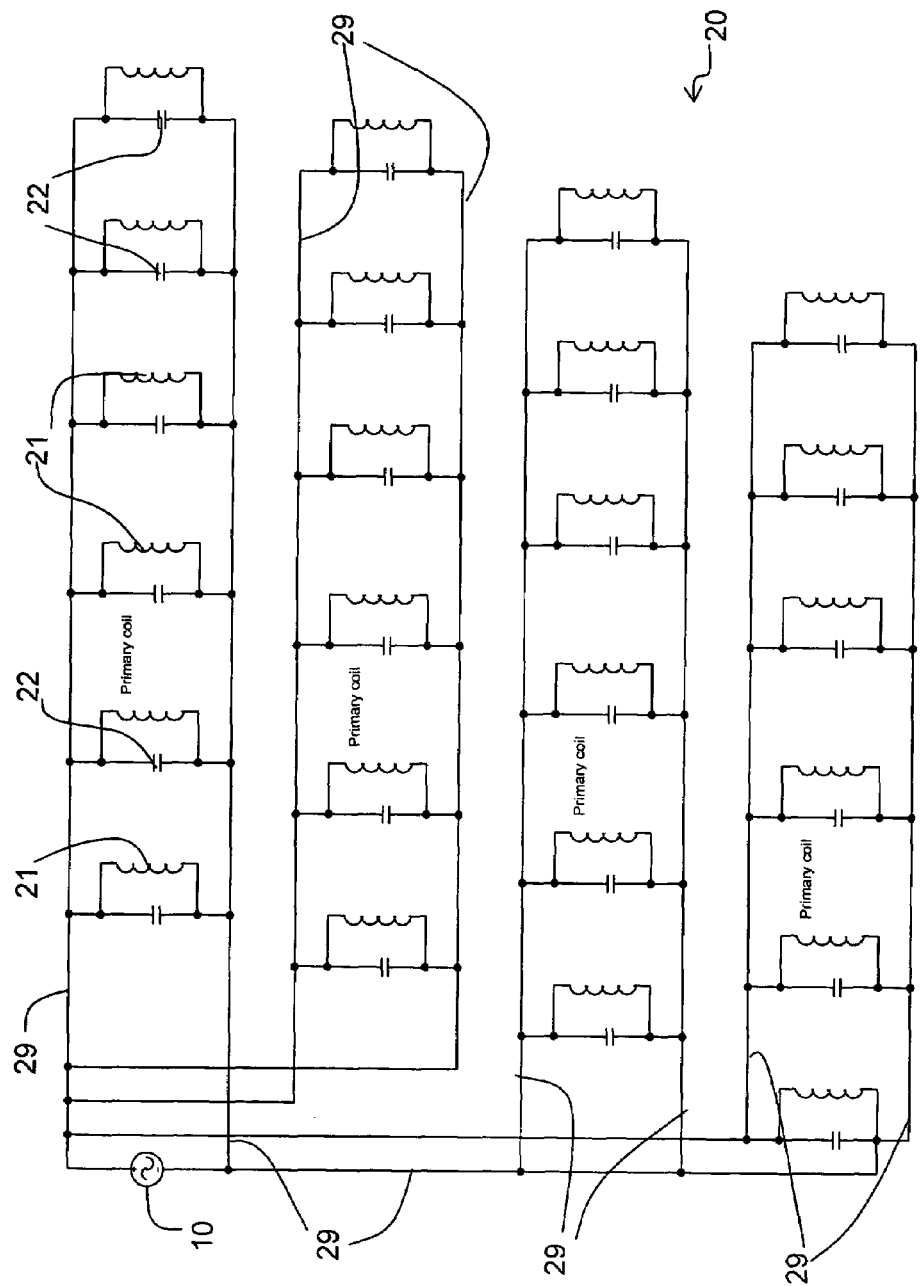
FIG. 6 is a schematic view of an embodiment of a two-dimensional primary coil array that is conceptually identical to that of FIG. 4 in accordance with one embodiment.

FIG. 6 is a schematic view of an embodiment of a two-dimensional primary coil array that is conceptually identical to that of FIG. 4. In this embodiment all primary coils 21 are driven exactly in phase. So it suffers from the same ills as in FIG. 4, namely, it has strong coupling non-uniformity, is difficult to scale up, and has magnetic field null as well as field reversal regions which makes effective contact-less power transfer impossible in those areas. The existence of dead spots in the active area of the primary surface 27 is a serious drawback which will impede the usability of the system and limit its acceptance. One possible way of removing the dead spaces is to introduce another array of coils 21 underneath the first coil array. The second array is offset from the first array so that its own dead spots do not directly overlap with those of the first array. The second array can be driven by an independent RF power source 10 which has no fixed phase relationship with the RF source 10 for the first array. Alternatively, the second array can be driven 900 out of phase from the first one. In theory at least, when a secondary coil 31 is placed on a dead spot of the first coil array, it is still covered by the overlay coil array. In practice, the dead areas usually form long and narrow contours, hence some dead areas created by the original array and those created by the overlay array may still overlap. It is possible to design an overlay array network such that there are no overlapping dead spaces. However, even in those designs, there are still spots where the inductive magnetic field and hence the magnetic coupling is too weak to be useful. The introduction of the overlay array also increases the overall thickness as well as the system complexity of the primary unit 20. There are other issues as well. For example, if the coils 21 of the stacked arrays are in the shape of a dense spiral formed on a layer of printed circuit board, then the amount of copper on the top array may well prevent the inductive field generated by the lower array from reaching the top surface, and vice versa. Thus, the introduction of an overlay array mitigates, but does not solve the coupling non-uniformity problem.

Figure 7:
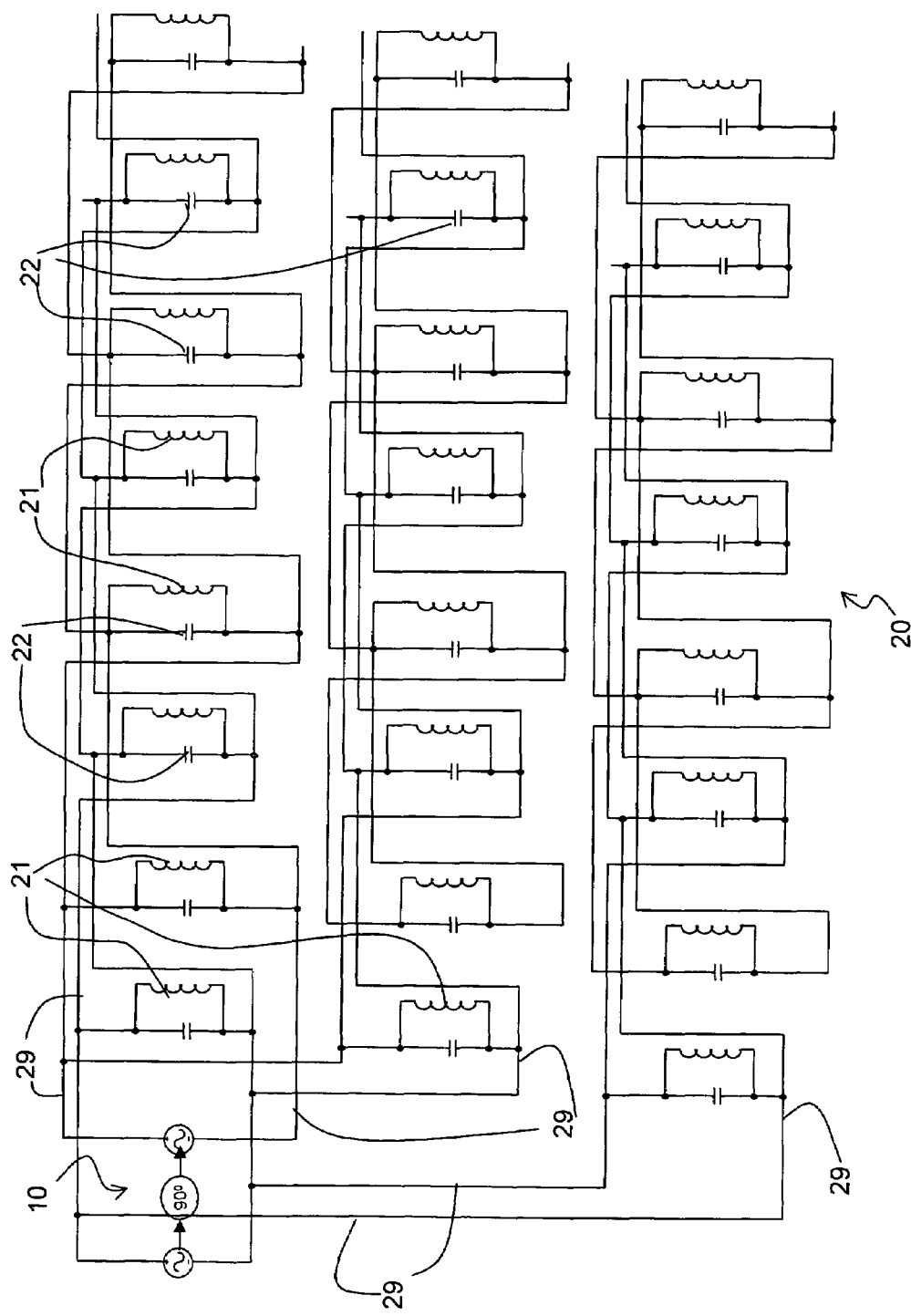
FIG. 7 is a schematic view of an alternative embodiment of a two-dimensional primary coil array that is conceptually identical to that of FIG. 5 in accordance with one embodiment.

FIG. 7 is a schematic view of an embodiment of a two-dimensional primary coil array that is conceptually identical to that of FIG. 5. The primary coils 21 are again divided into two groups in a checkerboard fashion. All physically adjacent coils are driven 900 out-of-phase and any two coils which are one coil apart and therefore belong to the same subgroup are driven 1800 out-of-phase. The same argument for the independence of primary coils 21 that applied to the simplified one dimensional array in FIG. 5 still applies here. The mutual inductances between two nearest coils that belong to the same subgroup still remains small although they are larger than those in the one dimensional case since the two coils are actually right next to each other along the diagonal. The coils 21 from the two subgroups have substantially no coupling between them because each interior coil from one subgroup is surrounded by four coils from the other subgroup whose net induction flux through the center coil is ideally zero.

Alternatively, the two-dimensional primary coil array can also be driven by other multi-phase scheme such as a 6-phase drive. Although for such drives, the independence of coils is no longer guaranteed. The larger mutual inductances among the coils 21 make it harder for the drivers to maintain their phase relationships because of the mutual couplings. The added complexity of the higher phased drives also leads to greater cost. The chief advantage of higher phased drive schemes is the increased uniformity of the inductive magnetic field.

FIG. 8a shows the magnetic fields 261, 262, 263, 264, 265 for an array of five coils and the total magnetic field when all five coils are energized in phase by currents of equal amount. It is noted that the magnetic field strength is the strongest immediately above the current carrying conductor that constitute the coil, and it dips to a minimum at the center of the coil. In addition, the perpendicular component of the magnetic field changes its sign as it crosses the outer boundary of the coil. The field reversal behavior is evident from the large negative dip just outside the coil in FIG. 8a. It can be seen from the graph that the field reversal behavior is significant only for up to a distance equal to about one diameter of the coil. Beyond that distance the strength of the reverse field diminishes rapidly. With all five coils driven in phase, the resultant magnetic field 266 is the sum of all the magnetic field generated by the five coils. Since the currents in adjacent conductors from different coils tend to cancel out, the five coils sum to an equivalent of one large coil. The magnetic field distribution 266 can be seen to be much lower in strength with a pronounced dip in the center of the equivalent large coil.

The large overlap in magnetic field distribution between adjacent coils means that they will have a very large mutual inductance, and the field reversal also implies that the mutual inductive coupling between the two coils will be negative. Because of the large mutual coupling between adjacent coils, it is no longer possible to treat the individual coils as independent. Hence, for example, the total inductance of two adjacent coils driven in parallel and in phase is not half of the inductance of a single coil, but is a lot less owing to the large negative mutual coupling between the two coils. This makes it difficult to use the design for a smaller version of the primary unit to design a scaled up version since all the inductances have to be recalculated. Furthermore, in the scaled up version, more turns are needed to compensate for the strong mutual cancellation of the magnetic field.

In calculating the sum of the magnetic fields 266 in FIG. 8a, it was assumed that the adjacent coils literally touch each other. It was also assumed that the coils are made of wires with no width. That explains why there are no reverse field regions for the summed field in FIG. 8a. In reality, coils are made of wires of finite size, and wires from adjacent coils need to be insulated from each other, usually by an air gap. FIG. 8b depicts the summation field 267 of the same five coils except that any two adjacent coils are separated by ⅛th the coil diameter. The rather pronounced negative peaks are the result of the overlap of the negative peaks from adjacent coils. In practice, the coils often take the shape of a spiral, comprising a series of turns having substantially linear sections. Those kinds of coils are often constructed using printed circuit board (PCB) technique. Under certain conditions, a plurality of such coils can also create large reverse field regions when they are driven in phase. The mere presence of field reversal regions is in itself not a significant issue since the direction, or the sign, of the magnetic field is an oscillating function of time; hence the sign of the magnetic field at any particular instant is unimportant. However, the very existence of the reverse field implies that there are zero field contours which are the borders between the normal field regions and the reverse field regions. A secondary coil 31 placed at or around one of the field nulls will see both positive magnetic flux and negative magnetic flux which approximately cancel each other. Since the magnetic coupling between the primary coils 21 and the secondary coil 31 is directly proportional to the amount of magnetic flux that is enclosed by the secondary coil 31, the cancellation of the magnetic flux significantly reduces the coupling and therefore the power transfer.

Multi-phase driving of the primary coils addresses both the field reversal problem and the scalability problem. This can be seen in FIG. 9, which displays a time sequence 271, 272, 273 of magnetic field intensity to depict the traveling wave nature of the magnetic field excited by a long linear array of coils driven by the circuit shown in FIG. 5. FIG. 10 shows the magnetic fields 391, 392, 393, 394, 395 excited by a long linear array of primary coils 21 at various times, in which the complete absence of magnetic null is evident.

A multi-phase driving of the primary coil array is similar in nature to the technique used in driving a phased array antenna. Ideally, an N-phase drive, where N is a large number, will produce a magnetic field distribution which is close to a traveling sinusoidal waveform. In practice, N is usually limited to a small to moderate number, since a large N would entail the use of a large number of costly phase shifters. The minimum N is dictated by Nyquist Sampling Theorem. The 4-phased drive sequence depicted in FIG. 9 clearly has an appearance of a highly distorted traveling sine wave. Due to the distorted nature of the traveling wave profile, the RMS (root-mean-square) magnetic field strength is not strictly uniform, as it would if the profile were truly sinusoidal. The calculated RMS variation of the magnetic field strength for the sequence depicted in FIG. 10 is about ±22%. A more relevant measure of the field non-uniformity is to use the average field intensity of the computed magnetic field over a small aperture to calculate the RMS variation. By choosing an aperture which corresponds roughly to the physical dimension of a secondary coil, the computed RMS variation is reduced to ±13%. A similar computation is done for a 6-phased drive example, and the aperture averaged RMS variation is only ±6%. However, the superior RMS variation figure is tempered by the higher mutual coupling among coil elements which makes phased driving more difficult and costly.

Figure 11:
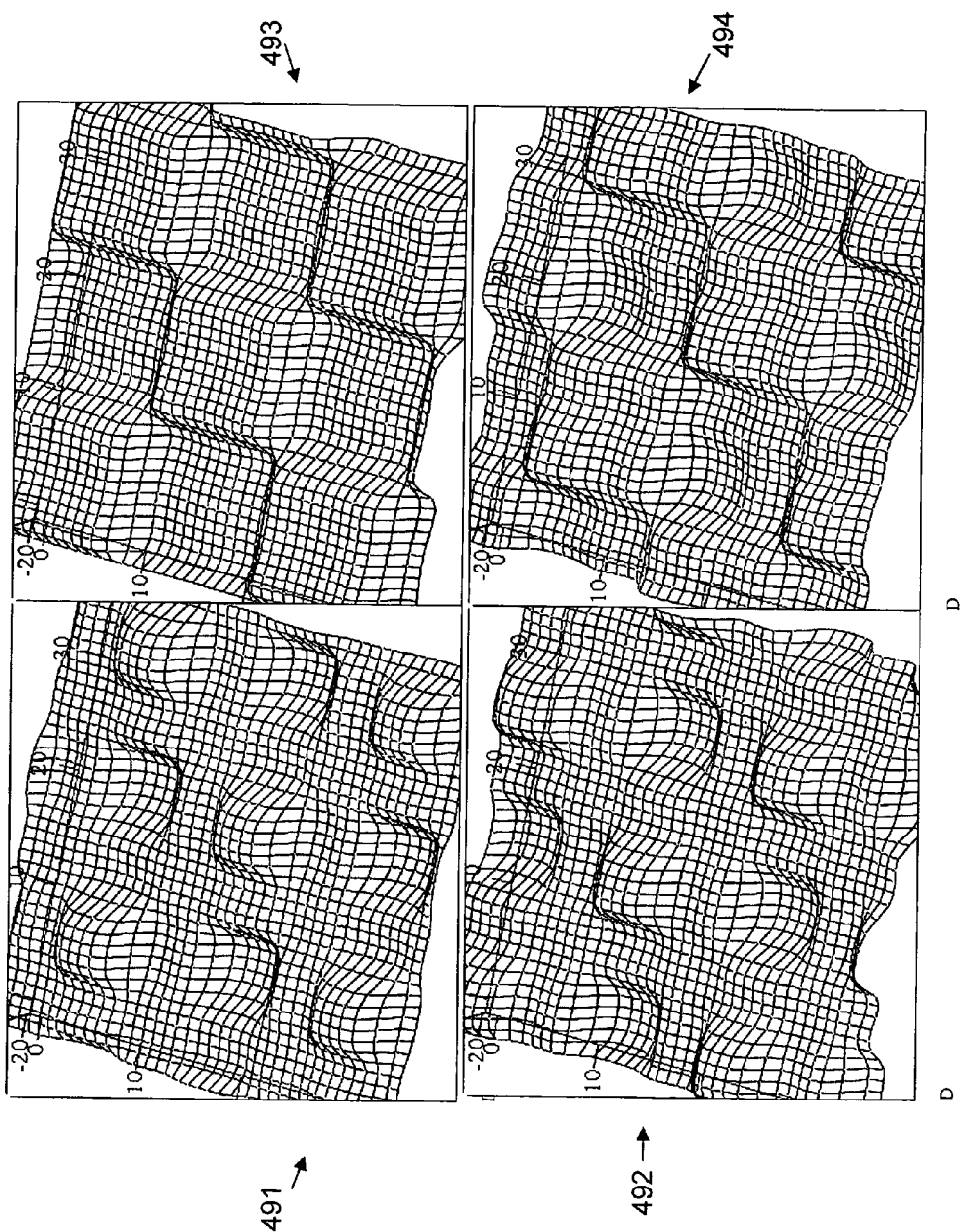
FIG. 11 displays a time sequence of magnetic field intensity distribution to depict the traveling wave nature of the magnetic field excited by a large two dimensional array of coils driven by a circuit which is a two dimensional generalization of the circuit shown in FIG. 5 in accordance with one embodiment.

Applying multi-phased drive to a two-dimensional primary coil array results in a traveling wave propagating along the diagonal direction. FIG. 11 displays a time sequence 491, 492, 493, 494 of magnetic field intensity distribution that shows the traveling wave nature of the magnetic field excited by a two dimensional array of primary coils 21 driven by the circuit depicted in FIG. 7. The two dimensional array has roughly one and a half times the RMS variation of its one-dimensional counterpart, or around ±20% for a 4-phased driving scheme while the 6-phased scheme has about ±10%.

Owing to the similarity of the multi-phase RF driving technique to the techniques employed in driving a phased array antennas, care must be taken to ensure that the RF radiation level be kept at an extremely low level. In a phased array antenna, bore sight direction is determined by the apparent phase velocity of the phased array elements. For example, when all the array elements are in phase, the apparent phase velocity becomes infinity, then it follows that the bore sight direction is the normal direction to the plane of the phased array (assuming planar phased array). When the apparent phase velocity is twice the speed of light, the bore sight direction is 300 from normal. In general, the deviation of the bore sight direction from normal is simply the arc-cosine of the ratio between the speed of light and the apparent phased speed of the array radiating elements. It should be apparent that the apparent phase velocity of the radiating elements should never be lower than the speed of light. Hence, in order to prevent the primary unit from radiating, the apparent phase speed of the diagonal traveling wave should be much smaller than the speed of light. In the 4-phased drive, the array pitch, which is roughly the diameter of a single coil, is ¼th the apparent phase wavelength, hence the apparent phase speed is the speed of light divided by 4 times the vacuum wavelength of the electromagnetic wave oscillating at the RF frequency and then by the array pitch. As an example, the RF frequency is taken to be 30 MHz, and the array pitch of the primary unit is assumed to be 10 cm, then the apparent phase speed is just 4% of the speed of light. This ensures that the primary array driven by a 4-phased RF driving technique does not radiate. By contrast, the single phase drive technique produces an apparent phase speed which is equal to infinity; hence RF radiation is not precluded. However, since the active area of the primary unit is typically much smaller than the RF wavelength, the level of RF radiation is still quite small since the primary unit behaves like a very poor antenna with negative antenna gain.

FIG. 12 is an isometric view of an exemplary embodiment of the secondary coil 31 and circuit elements in the device adapter. The secondary unit 30 comprises a spiral shaped PCB trace coil as the receiving coil 31, a main capacitor 32a in parallel connection with the receiving coil 31, and a bank of switched capacitors 32b which are also in parallel with the main capacitor 32a to form a variable and electronically adjustable capacitance, an impedance matching network 37a, a full bridge rectifier 37b, output capacitors 37c that smoothes out output voltage ripple, a feedback voltage controller 34 to regulate the DC output voltage even as the inductive coupling between the secondary unit 30 and the primary surface 27 is constantly changing. The output capacitor 37c also serves as the storage capacitor which accumulates energy to power the feedback controller during initial startup. During startup phase, the variable capacitor 32 of the secondary unit 30 is still at its default value and the rectified DC voltage is still unregulated, the unregulated DC current starts charging the storage capacitor 37c until 37c reaches a voltage level that is high enough to turn the controller 34 on. Once the feedback controller 34 is turned on, it starts to regulate the voltage by comparing the voltage of the storage capacitor 37c and a reference voltage and takes the difference which is used as an error signal to control the variable capacitor. The capacitance adjustment causes the resonant circuit of the secondary unit 30 to tune in to the RF driving frequency of the primary unit 20 until the voltage reaches the reference voltage value. The controller 34 can also compensate for any change in magnetic coupling or device load variation by tuning the secondary resonant circuit in or out of the primary RF driving frequency through continuous output voltage monitoring and capacitance adjustment.

The ability of the secondary unit 30 to regulate its output voltage is advantageous in many situations where the device to which the secondary unit 30 is attached requires a regulated voltage to power it. Examples of devices that require regulated power are mobile phones, personal digital assistants, laptop computers, MP3 players, ipods, digital cameras and camcorders, radios, portable game consoles or players, etc. Typically, such device is powered by a regulated switched mode power supply whose output voltage and current are specifically designed for its use. The need of a dedicated DC power supply is a major inconvenience for an end user who may carry a multitude of electronic devices with him or her and each device requires a different power supply. In view of the present invention, the obvious solution is to equip each device with a secondary unit 30 which can receive power from the primary unit 20 and convert it to whatever the voltage the device needs. However, if the output voltage from the secondary unit 30 is unregulated, it may need a linear voltage regulator if the power need of the device is small or a DC-DC converter if more efficient voltage regulation is required. Since the secondary unit 30 of the present invention can supply regulated voltage to the device, the need to have a separate voltage regulation device is obviated, making the conversion from the conventional power supply to the contactless one of the present invention painless. With the addition of a DC current monitoring element, such as a series current sense resistor, or a current mirrored sense resistor when MOSFETs are used in the full bridge rectifier section 37b, it would be possible to program the feedback controller 34 to control both the voltage and current to behave like a lithium ion/polymer charger with little or no additional cost.

This specific embodiment of the secondary unit 30 can also be profitably employed to construct a universal adapter for portable devices. Modern electronic devices are designed with a lot of built-in protection mechanisms, including over-voltage protection, under-voltage protection, over-current protection, etc. If such a device is connected to a variable voltage power supply, it would block the supply voltage until the supply voltage exceeds a lower voltage threshold. Once the supply voltage has the right value, the device's power interface module will connect the device's power unit to the power supply. During the operation, if the supply voltage spikes to a value that exceeds the threshold for over-voltage protection, the device's power interface module immediately disconnect the power from the power supply. Similarly, if the supply voltage dips to a value that is below a certain threshold, which may or may not be the same as the initial threshold, then the device also disconnect itself from the power supply, until the supply voltage returns to its normal range. Thus, it would be possible to program the feedback controller 34 of the secondary unit 30 to increase the regulated output voltage in steps, with a sufficient wait time to account for the initial delay before the power interface module of the device connects the device to the secondary unit's output. The controller 34 of the secondary unit 30 monitors the device current to determine whether the connection has been made. When the controller has detected the rise in output current beyond a certain current threshold, it determines that the connection has been made, and the voltage scanning stops. During the initial voltage scanning steps, the controller also imposes a strict current limit to prevent inadvertent over voltage situation which might damage the device if it is not equipped with over-voltage protection. This may occur when the device in question is in a standby mode and does not consume enough current for the feedback controller to determine whether the device power connection has been made, in which case the controller 34 will decide that the voltage is not right and proceeds to step up to another voltage. The controller 34 can detect fault conditions to determine whether over-voltage fault has occurred since under normal conditions the device's power interface module would insert a hysteresis time delay before connecting the power supply to the device, hence if that time delay is not there, then an over-voltage fault is indicated. Whenever a fault occurs, the controller 34 can reset the process and start the voltage scan sequence all over again until the power connection has been made without triggering a fault.

A more detailed schematic view of the circuit elements in the device adapter is presented in FIG. 13. The proportional, differential, and integral (PID) controller 34a monitors the output voltage after the storage/smoothing capacitor 37c and compares it to a reference voltage. The value of the bias capacitor 32a is selected in such a way that, when it is coupled to the secondary receiving coil 31, the combined LC network resonates with the primary RF driving frequency in the absence of any magnetic coupling with the primary unit 21 in conjunction with the receiving coil 31. This choice of the bias capacitance 32a also ensures that even without any further adjustment of the parallel capacitance, the RF voltage induced by the primary coils 21 when the secondary unit 30 is in magnetic coupling with the primary unit 20 is sufficient to power the PID controller 34. Furthermore, the nature of the coupling between the secondary 30 and the primary unit 20 is such that it tends to slightly raise the resonance frequency, which means that there needs to be additional parallel capacitance in order to restore the resonance to its original value so that it can stay matched with the RF driving frequency. This capacitance correction is provided by a bank of switched capacitors 32b shown in FIG. 13. Only four switched capacitors 32b are shown, although it would be more advantageous to have eight such capacitors 32b to provide both the resolution and the range needed for a more robust power transfer. The four capacitors 32b are selected to have values which are powers of 2 of the smallest capacitance. So for example, if the smallest capacitance is 100 pF, then the other three capacitances are 200 pF, 400 pF and 800 pF. Each capacitor is in series with a MOSFET switch which can be turned on to enable the capacitor it is directly connected to, or to turn off to disable the capacitor. Since each MOSFET switch can be either ON, or OFF, the switched capacitor bank 32b can provide 24 or 16 different capacitance values which are more or less linearly distributed with values from 0 pF to 1,500 pF. The capacitance values are not precise because of the inherent variation of stock capacitors as well as the source drain capacitances of the MOSFETs. The source drain capacitance of the MOSFET is unimportant when the MOSFET is ON. However, when MOSFET is OFF, the capacitor it is connected to is not completely disabled because of the source drain capacitance which is in series with the external capacitor. The source drain capacitance of the MODFET is not a constant, either, but depends on the source drain voltage. Hence it would be difficult to modify the capacitance values of the external capacitors to compensate for the added OFF capacitances caused by MOSFETs.

Because of the binary nature of the switched capacitor bank 32b, the PID controller 34 can control the capacitance of the capacitor bank 32b simply by issuing a binary word. For example, a 4-bit word can be used in the capacitor bank 32b depicted in FIG. 13 to change the capacitance to a multiple of the smallest capacitance such that the integer multiple is simply the numerical value of the 4-bit word. In this sense, the switched capacitor bank 32b can be considered to be a DA (digital-to-analog) converter which converts a binary word into an analog capacitance value. For a standard 8-bit controller, it is more likely that the bank will have eight capacitors, because it can then be controlled by an 8-bit word directly.

Figure 14:
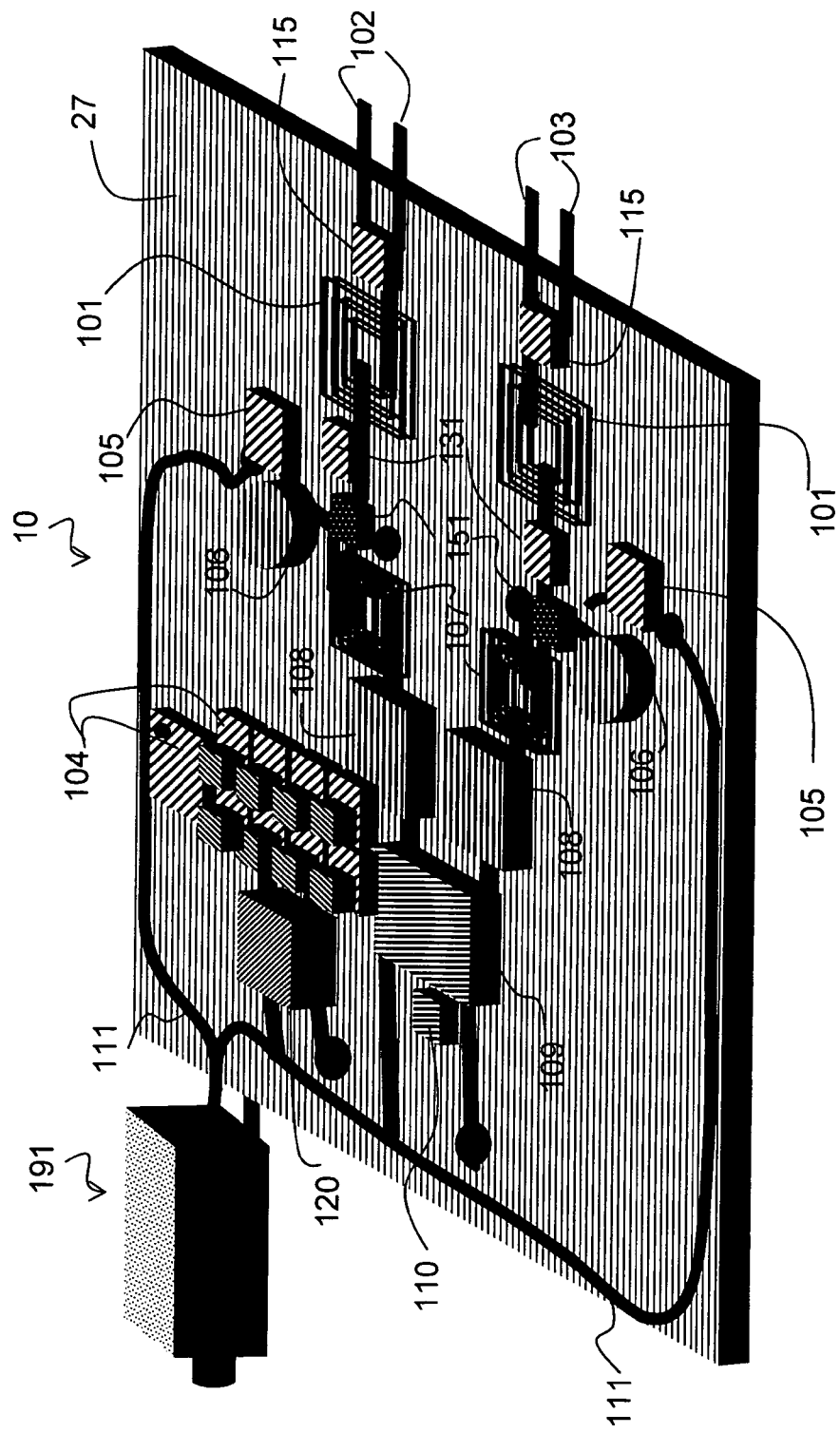
FIG. 14 is an isometric view of the RF generating module in the primary unit which generates two pairs of RF signals whose phases are 90 degrees apart in accordance with one embodiment.

To supply the RF power to the primary coil array, the primary unit 20 must first convert the main power from the wall jack to DC power 191, which is typically a switched mode power supply. The DC power is subsequently converted to a multi-phased RF power supply 10. FIG. 14 is an isometric view of one embodiment of the RF generating module in the primary unit 20 which generates two pairs of RF signals whose phases are 900, 1800, 2700, and 00, respectively. Shown are, square wave generator 109 with crystal oscillator 110, a pair of current amplifiers 108, a pair of transformers 107 to step down the voltage, a pair of power MOSFETs 151 for high-frequency power switching, a pair of chokes 106 and their attendant smoothing capacitors 105 to isolate the DC power supply from the switching noise and vice versa, a pair of source drain capacitors 131 to control switch timing, and a pair of series connected inductors 101 and capacitors 115 to provide series resonance circuits, and two pairs of output ports 102, 103, one pair 102 for the 00 and 1800 phases, and the other pair 103 for the 900 and 2700 phases. The inductors 131 and transformers 101 as well as the chokes 106 have either ferrite cores or iron powder cores, depending on the RF frequency, or other suitable high permeability magnetic materials to provide sufficient inductance values without needing a large number of turns for the coils. The use of magnetic materials for the transformers 107 and inductors 101 also reduces RF cross coupling due to the leakage inductive magnetic field. This is because the high permeability material can act as a guide for the magnetic flux since the magnetic field prefers to complete its loop through a low reluctance path which the magnetic material provides. Not shown are metal mesh Faraday cages which are placed over critical components such as the square wave generator 109, the current amplifiers 108, all the transformers 107 and inductors 101, etc. in order to provide RF shielding of unwanted inductive magnetic field. This can prevent, for example, the unwanted coupling between a transformer 107 and the square wave generator 109. Since the square wave generator 109 is capable of generating only a small amount of RF current, even a relatively small interfering stray RF magnetic field can significantly distort the waveform, thereby creating a vicious positive feedback cycle, causing the RF generator 10 to become unstable.

The power supplied by the RF module is transmitted to the primary coils 21 through RF waveguides 2. The most common waveguides are coax cables, not shown, which are lightweight, flexible, and have relatively low transmission loss. Within the primary unit 20 the RF power is delivered to the individual coils simply via separate rails 29. However, if the primary surface 27 is large, then the RF power would be more advantageously delivered via coplanar waveguides or their equivalent in order to minimize transmission loss, reflections, and radiation. Splitters are also needed in conjunction with the coplanar waveguides to allow the individual coils to tap the RF power delivered by the shared waveguides.

Figure 15:
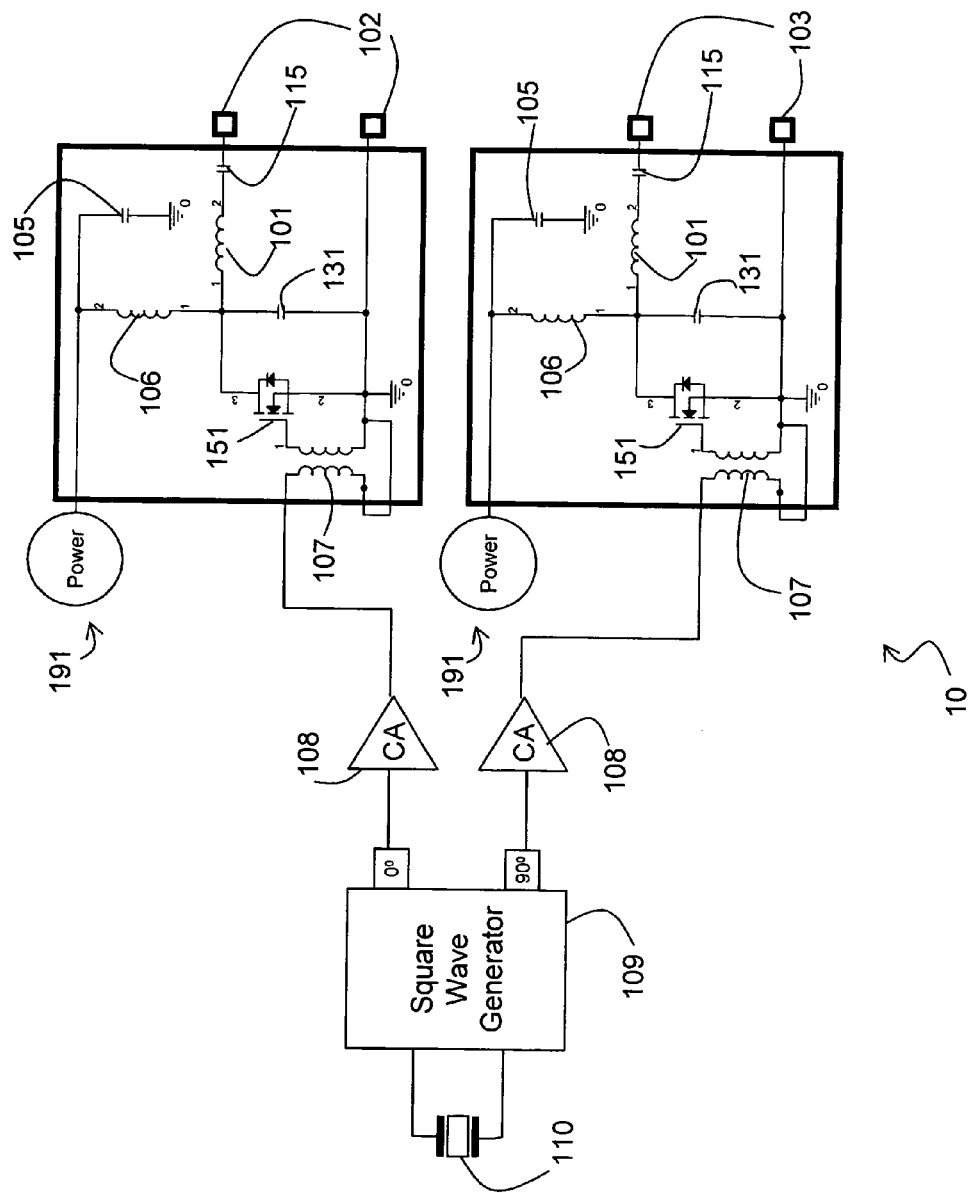
FIG. 15 is a more detailed schematic view of the RF generating module in the primary unit which generates two sets of RF signals which are 90 degrees apart in their respective phases in accordance with one embodiment.

FIG. 15 is a more detailed schematic circuit diagram view of the RF generating module in the embodiment depicted in FIG. 14. The square wave generator 109, with a crystal oscillator 110 to provide a stable, precise frequency reference, generates two square wave signals that are 900 apart in phase. Each signal is passed through a current amplifier 108 and then a step down transformer 107 to boost its current. The current amplification is needed because the power MOSFET switches 151 require large gate currents to switch at radio frequencies. Further current amplification is provided by the transformer pair 151 which steps down the drive voltages. The step down transformers 151 also insulate the gate drive section from load variations and RF reflections further down stream, which reduces the destabilizing effect of the Miller capacitance.

The section of circuit immediately after the transformer 107 is a class E amplifier. The choke 106 is used basically as a large flywheel which both insulates the DC power supply 191 from large high-frequency fluctuation and provides a constant current source to the rest of the class E circuitry. The series LC resonator 101 and 115 provides a high "Q" environment to filter out higher harmonics and enhance the fundamental frequency to produce a substantially sinusoidal waveform at the output ports 102 and 103. It is to be appreciated that a class D amplifier, or any other switched pulse amplifier design can be profitably employed to accomplish the RF generating function. Both class E and class D amplifiers have been known to have achieved power conversion efficiencies as high as 92% and up, far higher than the more traditional class AB or class C amplifiers which typically have below 50% power efficiencies.

Switched pulse amplifiers are quite sensitive to load variations and load power reflections, which can be somewhat mitigated by Faraday shielding of magnetic components and gate current amplification. Ideally, the power MOSFETs 151 are switched only when there is a zero crossing for the source-drain current. When a power MOSFET is switched while its source drain current is still nonzero, the flywheel actions of the choke and the main inductor will try to maintain the current during the switch transition, thereby creating large voltage spikes with high harmonic content which lowers the overall power efficiency as well as distorting the output waveform. Unfortunately, the zero crossing timing of the source drain current is a strong function of both the load and the reflected RF power when there is a load impedance mismatch. However, since the load as well as the load impedance changes as soon as a device is placed on or removed from the primary surface 27. And even during wireless power transfer, there is no assurance that those values would not change. A notebook computer, for example, would vary its current consumption as work load varies, and can go into a sleep mode with a prolong period of inactivity. A cell phone consumes most of its power during voice and data transmission, or when it is performing its automated chores or when a movie, a video, or high fidelity music is being played. If the RF generation module is optimized for a particular load, then it may work poorly for another load such as placing two cell phones on the primary surface 27, or when there is no device on the surface. To solve this problem, a power management module 193 which can perform power factor correction (PFC) is needed.

Figure 16:
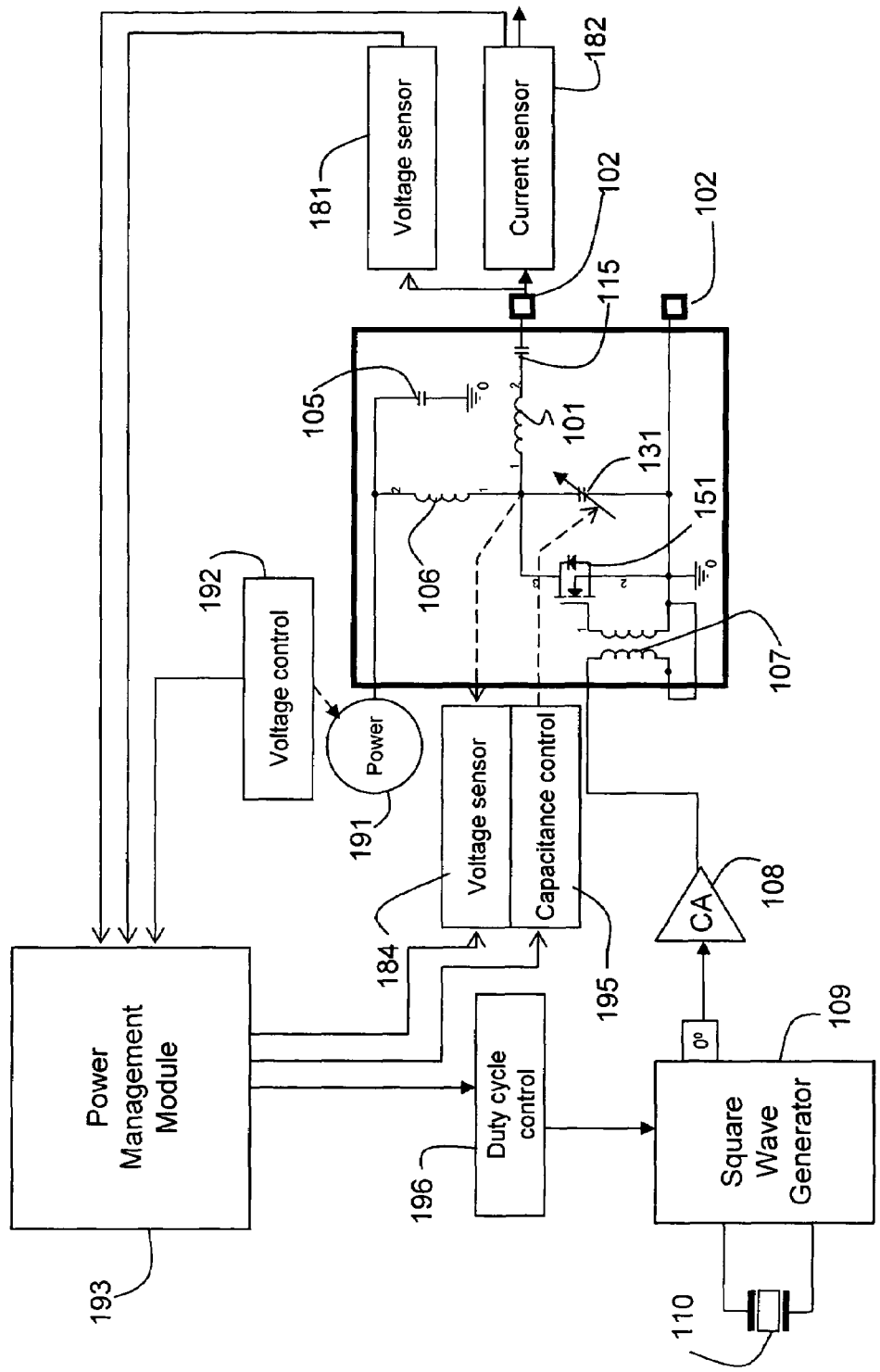
FIG. 16 shows a power factor correction subsystem for the class E amplifier module depicted in FIG. 15 in accordance with one embodiment.

FIG. 16 shows a PFC subsystem for the class E amplifier module depicted in FIG. 15. Current and voltage sensors 181, 182 are used to measure the output current and voltage. The results of the measurement can provide information about equivalent load impedance, RMS voltage and current, and the harmonic content of the amplifier output. Another voltage sensor 184 is employed to monitor the drain voltage of the MOSFET transistor 151 whose harmonic content gives a very good indication of whether the class E amplifier is operating efficiently or not. Those data are fed to the power management module 193. Based on those inputs, the power management module 193 sends control signals to voltage control module 192, capacitance control module 195 and duty cycle control module 196 to adjust the voltage of the main power supply 191 to the amplifier, the capacitance of the source drain capacitor 131, and the square wave generator 109. The DC voltage control is achieved by changing the reference voltage of the fly back controller within the switched mode power supply. The capacitance adjustment is accomplished by an electronically switched capacitor bank 131, and the duty cycle control is performed by a digital potentiometer. Because the control has multiple inputs and multiple outputs, or MIMO, standard feedback control schemes such as PID scheme would no longer work. More advanced control schemes such as fuzzy logic control, linear or recursive least mean square or artificial neural network controls are needed. These approaches generally start with an objective function defined as the mean square error of one or more linear or nonlinear functions of the inputs. By way of example, the objective function could be the ratio of the energy of the second harmonics to the fundamental of the source voltage. Using a hill climbing (actually minimum seeking) adaptive algorithm, the power management module can gradually learn to control its outputs to reduce the harmonic content at the source voltage.

The drawings FIG. 12 through FIG. 16 are for illustrative purpose, and are not meant to be comprehensive, nor are they intended to exclude other components or techniques which are similar in scope and can perform similar functions. The switched capacitor bank performs the function of an electronically controlled capacitor, and as such, it can be replaced by other electronically controlled capacitors such as varactors, or by a micro-electro-mechanical system (MEMS) based thin film capacitor. Different sensors and control elements can be substituted in FIG. 16 for the PFC without fundamentally altering the basic principle of adaptive power optimization of the RF power module. A switched mode DC power supply can also be replaced by a large primary battery, or a fuel cell battery, in which case the control of the DC supply voltage may be inhibited, or a DC-DC converter may becomes necessary. The PID controller in the secondary unit may be replaced by a hybrid scheme where the four most significant bits are exhaustively searched to find a coarse optimum, and a PID controller then takes over to perform an analog search. Another alternative is to exhaustively search all eight bits periodically to find and track the optimum point. The output voltage or current of the secondary unit may be unregulated, and the PID controller or its equivalent is only employed to pull in the resonance. The multi-phased RF driving techniques used to power the apparent traveling wave in the primary unit could also be substituted by a single phase driver that relies on the inherent slow wave structure of the primary coil array to excite a slow traveling wave across the primary coil array. Another alternative embodiment is to use a random multi-phased driver where the fixed phase relationships are replaced by random phase relationships.

It is to be understood that the scope of the present invention is not in any way limited to the specific embodiments heretofore disclosed, but only by the following claims.

What is claimed is:

1. A system comprising:
   a first unit with a substantially flat top surface, operatively connectable to a RF power source having at least a first frequency, and including an array of local resonance circuits having a resonance frequency selected to present a large load impedance to the RF power source; and
   a secondary unit, including a resonance circuit having an adaptive self impedance such that when the secondary unit couples to a local resonance circuit, the local resonance circuit presents a lower load impedance to the RF power source allowing radio frequency power to flow from the first unit to the secondary unit.

2. The system of claim 1 wherein;
   said local resonance circuits include at least a capacitor in parallel connection with an inductive member.

3. The system of claim 1 wherein;
   said secondary unit includes at least one capacitor in connection with an inductive member.

4. The system of claim 3 wherein;
   said capacitor is operatively connected so as to be in LC resonance with said inductive member of the secondary unit.

5. The system of claim 1 wherein;
   said array of local resonance circuits are arranged in a substantially periodic manner.

6. The system of claim 5 wherein;
   said array of local resonance circuits are to be driven by corresponding radio frequency (RF) drivers such that each RF driver has a fixed phase relationship with respect to a separate RF driver.

7. The system of claim 6 wherein;
   said phase relationships are integer multiples of a fixed phase to form a circular array of equally spaced phases that cover 3600.

8. The system of claim 7 wherein;
   when said substantially periodic array of local resonance circuits is driven by said plurality of phased drivers to create a traveling wave pattern across the top surface of the first unit.

9. The system of claim 7 wherein;
said plurality of phases includes four phases that are 0O, 90O, 180O, and 270O.

10. The system of claim 7 wherein;
said plurality of phases includes six phases that are 0O, 60O, 120O, 180O, 240O, and 300O.

11. The system of claim 4 wherein;
said substantially periodic array of local resonance circuits are driven by a plurality of RF drivers such that each RF driver has a random phase relationship with respect to another RF driver.

12. The system of claim 11 wherein;
when said substantially periodic array of local resonance circuits is driven by said plurality of phased drivers, to create a randomly traveling wave pattern across the top surface of the first unit.

13. The system of claim 1 wherein;
said secondary unit comprises at least one electronically adjustable capacitor module.

14. The system of claim 13 wherein;
said electronically adjustable capacitor module comprises a bank of parallel capacitors switched by transistors.

15. The system of claim 14 wherein;
said transistors are MOSFETs.

16. The system of claim 13 wherein;
said secondary unit includes a controller to adjust a capacitance in response to variation of magnetic coupling between said secondary unit and the first unit.

17. The system of claim 16 wherein;
said controller of the secondary unit is operatively coupled to monitor an output voltage of the secondary unit and to adjust the capacitance to bring the output voltage to a predefined reference voltage regardless of a variation of the output current.

18. A method of transferring power from a first unit including local resonant circuits having a large load impedance at a first frequency, to a secondary unit that includes a resonant circuit having a self impedance, comprising:
   supplying radio frequency voltages to the local resonant circuits in the first unit;
   adjusting the self impedance of the secondary unit in response to the secondary unit being proximate to at least one of the local resonant circuits in the first unit; and
   transferring power from the first unit to the secondary unit via the at least one of the local resonant circuits and the resonant circuit of the secondary unit.

19. The method of claim 18 wherein the adjusting the self impedance includes varying a capacitance of the resonant circuit of the secondary unit.

20. The method of claim 18 wherein the supplying radio frequency voltages further comprises supplying radio frequency voltages having a plurality of phases generating a traveling wave radio frequency magnetic field pattern across a top surface of the first unit.

21. The method of claim 20 further comprising: adjusting said variable capacitance to increase a radio frequency voltage across said resonant circuit of the secondary unit.

22. The method of claim 20 further comprising: adjusting said variable capacitance to stabilize a radio frequency voltage across said resonant circuit of the secondary unit relative to a predefined reference voltage.

23. The methods of claim 21, wherein adjusting said variable capacitance further comprises monitoring the output voltage of said resonant circuit of the secondary unit.

24. The method of claim 23 wherein adjusting said variable capacitance further comprises using a feedback control.

25. The method of claim 24 wherein using the feedback control further comprises a PID control process.

* * * * *